United States Patent
Luo et al.

(10) Patent No.: US 12,430,289 B2
(45) Date of Patent: Sep. 30, 2025

(54) IMAGE FILE MANAGEMENT UTILIZING EDGE CLOUD NODES

(71) Applicant: Huawei Cloud Computing Technologies Co., Ltd., Guizhou (CN)

(72) Inventors: Rui Luo, Hangzhou (CN); Wei Yin, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 232 days.

(21) Appl. No.: 17/704,730

(22) Filed: Mar. 25, 2022

(65) Prior Publication Data

US 2022/0215002 A1 Jul. 7, 2022

Related U.S. Application Data

(63) Continuation of application No. PCT/CN2020/118047, filed on Sep. 27, 2020.

(30) Foreign Application Priority Data

Sep. 26, 2019 (CN) .......................... 201910918335.4

(51) Int. Cl.
*G06F 16/13* (2019.01)
*G06F 16/14* (2019.01)
*G06F 16/182* (2019.01)
*G06F 16/188* (2019.01)
*H04L 67/1097* (2022.01)

(52) U.S. Cl.
CPC ............ *G06F 16/13* (2019.01); *G06F 16/134* (2019.01); *G06F 16/14* (2019.01); *G06F 16/182* (2019.01); *G06F 16/188* (2019.01); *H04L 67/1097* (2013.01)

(58) Field of Classification Search
None
See application file for complete search history.

(56) References Cited

U.S. PATENT DOCUMENTS

| | | | |
|---|---|---|---|
| 8,352,941 B1 | 1/2013 | Protopopov et al. | |
| 11,030,187 B1* | 6/2021 | Boodman | G06F 16/235 |
| 2013/0254248 A1* | 9/2013 | Chang | G06F 16/182 |
| | | | 707/827 |
| 2014/0181984 A1* | 6/2014 | Kundu | G06F 21/64 |
| | | | 726/26 |

(Continued)

FOREIGN PATENT DOCUMENTS

| | | |
|---|---|---|
| CN | 102082832 A | 6/2011 |
| CN | 103078957 A | 5/2013 |

(Continued)

*Primary Examiner* — Neveen Abel Jalil
*Assistant Examiner* — John J Morris
(74) *Attorney, Agent, or Firm* — Conley Rose, P.C.

(57) ABSTRACT

An image file management method includes receiving a write instruction used to instruct to write a first image file; determining, based on the write instruction, at least one first edge cloud node from a plurality of edge cloud nodes included in an image file management system; and writing a plurality of data blocks included in the first image file into the at least one first edge cloud node, so that each first edge cloud node stores a part or all of the plurality of data blocks included in the first image file.

6 Claims, 12 Drawing Sheets

(56) References Cited

U.S. PATENT DOCUMENTS

| | | | |
|---|---|---|---|
| 2018/0027060 A1* | 1/2018 | Metsch | G06F 12/109 |
| 2018/0357017 A1 | 12/2018 | Karr et al. | |
| 2020/0322437 A1* | 10/2020 | Mardente | H04L 67/1097 |

FOREIGN PATENT DOCUMENTS

| | | | | |
|---|---|---|---|---|
| CN | 105205143 A | * | 12/2015 | G06F 16/13 |
| CN | 105335513 A | * | 2/2016 | G06F 16/182 |
| CN | 105516367 A | | 4/2016 | |
| CN | 107426258 A | | 12/2017 | |
| CN | 107483573 A | | 12/2017 | |
| CN | 107528924 A | | 12/2017 | |
| CN | 108173953 A | | 6/2018 | |
| CN | 109104464 A | * | 12/2018 | H04L 41/12 |

\* cited by examiner

IMAGE FILE MANAGEMENT UTILIZING EDGE CLOUD NODES

CROSS-REFERENCE TO RELATED APPLICATIONS

This application is a continuation of International Patent Application No. PCT/CN2020/118047 filed on Sep. 27, 2020, which claims priority to Chinese Patent Application No. 201910918335.4 filed on Sep. 26, 2019, which is hereby incorporated by reference in its entirety.

TECHNICAL FIELD

This application relates to the field of cloud computing technologies, and in particular, to an image file management method, apparatus, and system, a computer device, and a storage medium.

BACKGROUND

In the cloud computing field, an instance such as a virtual host or a container may be created by using an image file, and after the instance such as the virtual host or the container is created, a new image file may further be re-created based on the created instance such as the virtual host or the container, and may be stored for use. However, a size of an image file is usually relatively large. For example, the size of the image file usually can reach an order of magnitude of gigabyte (GB). Therefore, effective management performed on the image file is of great significance to improve storage efficiency of the image file, a creation speed of the virtual host, and the like.

In a related technology, a function of a cloud service system is usually implemented by using a central cloud node and a plurality of edge cloud nodes. The central cloud node and the plurality of edge cloud nodes work together. Image files in the cloud service system are managed by an image file management system. A management manner is as follows. All the image files are stored in the central cloud node, and when an edge cloud node needs to use an image file, the edge cloud node downloads the image file required by the edge cloud node from the central cloud node.

However, time overheads for downloading the image file from the central cloud node by the edge cloud node are relatively high, and a download speed is relatively low.

SUMMARY

This application provides an image file management method, apparatus, and system, a computer device, and a storage medium, to resolve a problem that time overheads for downloading an image file from a central cloud node by an edge cloud node are relatively high, and a download speed is relatively low.

According to a first aspect, this application provides an image file management method. The image file management method includes receiving a write instruction used to instruct to write a first image file, determining, based on the write instruction, at least one first edge cloud node from a plurality of edge cloud nodes included in an image file management system, and writing a plurality of data blocks included in the first image file into the at least one first edge cloud node, so that each first edge cloud node stores a part or all of the plurality of data blocks included in the first image file.

Data blocks included in the first image file are stored by edge cloud nodes, so that when any edge cloud node in the image file management system needs to use an image file, a corresponding data block may be obtained from an edge cloud node that stores data blocks in the image file, to obtain the image file required by the any edge cloud node, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file.

In a possible implementation of the first aspect, after receiving a write instruction used to instruct to write a first image file, the image file management method may further include generating an identification number of each data block included in the first image file, generating a first identification number topology of the first image file based on the identification number of each data block included in the first image file, where the first identification number topology records the data blocks included in the first image file, and storing the first identification number topology in an edge cloud node of the image file management system.

The first identification number topology of the first image file is generated, so that a user can quickly determine, based on the first identification number topology in a process of reading the first image file, first data blocks included in the first image file.

In addition, the first identification number topology may further carry information for describing content of the first image file, for example, version information of the first image file, a name of the first image file, and permission control information. Description information of the first image file is added to the first identification number topology, so that the content of the first image file can be quickly determined, and the data blocks included in the first image file and the content of the first image file do not need to be determined in a manner of reading the data blocks. This can reduce a read delay.

In a possible implementation of the first aspect, after writing a plurality of data blocks included in the first image file into the at least one first edge cloud node, the image file management method may further include establishing, based on a storage status of each data block included in the first image file in the at least one first edge cloud node, a storage correspondence between each data block included in the first image file and a first edge cloud node that stores the corresponding data block in the first image file, and storing the storage correspondence in an edge cloud node of the image file management system.

The storage correspondence is stored in the image file management system, so that the plurality of edge cloud nodes in the image file management system can obtain storage statuses of the plurality of first data blocks in the one or more first edge cloud nodes according to the storage correspondence.

In a possible implementation of the first aspect, before writing a plurality of data blocks included in the first image file into the at least one first edge cloud node, the method further includes determining a plurality of data blocks that are included in the first image file and that are not stored in any edge cloud node from all the data blocks included in the first image file.

In this way, in a process of writing the first image file into the image file management system, only the plurality of data blocks that are in all the data blocks included in the first image file and that are not stored in any edge cloud node may be written. This can avoid writing duplicate data into the image file management system, thereby reducing bandwidth occupation, reducing a write delay, and improving storage utilization of the image file management system.

According to a second aspect, this application provides an image file management method, where the method is applied to a target edge cloud node. The image file management method includes receiving a read instruction used to instruct to read a second image file, determining, based on the read instruction, one or more second edge cloud nodes that store a data block of the second image file from a plurality of edge cloud nodes included in an image file management system, and reading the data block that belongs to the second image file from the one or more second edge cloud nodes, to obtain the second image file.

Because the image file management system includes the plurality of edge cloud nodes, each edge cloud node is configured with a function of storing an image file, and the plurality of edge cloud nodes are configured to be capable of reading file block data stored by the edge cloud node in the image file management system, so that when any edge cloud node in the image file management system needs to use an image file, a corresponding data block may be obtained from an edge cloud node that stores data blocks in the image file, to obtain the image file, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file.

In a possible implementation of the second aspect, an implementation process of determining, based on the read instruction, one or more second edge cloud nodes that store a data block of the second image file from a plurality of edge cloud nodes included in an image file management system includes determining, based on the read instruction, all data blocks included in the second image file, determining one or more data blocks that are not stored in the target edge cloud node from all the data blocks included in the second image file, and determining the second edge cloud node that stores any one of the one or more data blocks.

The one or more data blocks that are in all the data blocks included in the second image file and that are not stored in the target edge cloud node are determined, and the second edge cloud node that stores the one or more data blocks is determined, so that the target edge cloud node can obtain, from the second edge cloud node, the data block that is not stored in the target edge cloud node and that belongs to the second image file. This can avoid obtaining duplicate data blocks, reduce a total quantity of the data blocks that need to be obtained, reduce a download quantity of data blocks, and reduce time overheads for obtaining the second image file.

In a possible implementation of the second aspect, an implementation process of determining, based on the read instruction, all data blocks included in the second image file includes determining a second identification number topology of the second image file based on the read instruction, where the second identification number topology records the data blocks included in the second image file, and determining, based on the second identification number topology, all the data blocks included in the second image file.

Compared with an implementation in which data blocks that belong to the second image file are determined by reading all data blocks, the implementation of determining, based on the second identification number topology, all the data blocks included in the second image file can reduce a data processing amount in a process of determining the data blocks that belong to the second image file, and can reduce a read delay of the second image file.

In a possible implementation of the second aspect, an implementation process of determining one or more data blocks that are not stored in the target edge cloud node from all the data blocks included in the second image file includes searching a storage correspondence between each data block in the second image file and an edge cloud node that stores the corresponding data block in the second image file, and when a correspondence between a given data block in the second image file and the target edge cloud node is not recorded in a storage correspondence of the given data block in the second image file, determining that the given data block is a data block that is not stored in the target edge cloud node.

Compared with an implementation in which a second data block that belongs to the second image file and that is not stored in the target edge cloud node is determined by comparing content of all data blocks stored in the target edge cloud node with content of each second data block, the implementation of determining, by using the storage correspondence, a data block that is not stored in the target edge cloud node can reduce a data processing amount in a process of determining the second data block that belongs to the second image file and that is not stored in the target edge cloud node, to further reduce a read delay of the second image file.

In a possible implementation of the second aspect, an implementation process of reading the data block that belongs to the second image file from the one or more second edge cloud nodes includes, when a given data block included in the second image file is stored in a plurality of second edge cloud nodes, obtaining a download status parameter of each second edge node that stores the given data block, selecting, based on the download status parameter of each second edge node that stores the given data block, a second edge cloud node from which the given data block is to be downloaded, and downloading the given data block from the selected second edge cloud node.

Based on the download status parameter of the second edge cloud node, the second edge cloud node used as a download source is selected from the plurality of second edge cloud nodes that each store the given data block included in the second image file. This can ensure a download speed of downloading the given data block.

In addition, to further ensure the download speed, a process of downloading the given data block from the selected second edge cloud node may include, in the process of downloading the given data block from the selected second edge cloud node, continuing to obtain a download status parameter of the selected second edge cloud node, when the download status parameter of the selected second edge cloud node is less than a reference parameter threshold, reselecting, from the plurality of second edge nodes that each store the given data block, a second edge cloud node from which the given data block is to be downloaded, where a download status parameter of the reselected second edge cloud node is greater than the reference parameter threshold, and re-downloading the given data block from the reselected second edge cloud node.

In a possible implementation of the second aspect, after reading the data block that belongs to the second image file from the one or more second edge cloud nodes, the image file management method further includes storing the data block that is of the second image file and that is read from the second edge cloud node, and storing, in an edge cloud node of the image file management system, a storage correspondence between each data block included in the second image file and the target edge cloud node, to indicate that the target edge cloud node also stores the second data block, so that another edge cloud node in the image file management system can obtain storage information of the second data block.

In a possible implementation of the second aspect, the image file management method may further include receiving an update instruction used to instruct to update information about a third image file, where the third image file is generated by the target edge cloud node based on a fourth image file stored in the image file management system, generating an identification number of each data block included in the third image file, generating a third identification number topology of the third image file based on the identification number of each data block included in the third image file, where the third identification number topology records data blocks included in the third image file, and storing the third identification number topology in an edge cloud node of the image file management system.

Information about an image file stored in the image file management system is updated, so that another edge cloud node in the image file management system can obtain the stored image file based on the information, which ensures data integrity of the image file stored in the image file management system.

In a possible implementation of the second aspect, when the image file management system further stores a fourth identification number topology of the fourth image file, the generating a third identification number topology of the third image file based on the identification number of each data block included in the third image file may include determining a first tree sub-topology in the fourth identification number topology, where identifier numbers of same data blocks included in the third image file and the fourth image file are leaf nodes in the first tree sub-topology, generating a second tree sub-topology based on data blocks that are in the data blocks included in the third image file and that are different from data blocks included in the fourth image file, where identification numbers of the data blocks that are in the data blocks included in the third image file and that are different from the data blocks included in the fourth image file are leaf nodes in the second tree sub-topology, and generating the third identification number topology based on the first tree sub-topology and the second tree sub-topology.

The implementation of generating the third identification number topology is essentially a process of performing incremental update on the basis of the fourth identification number topology to obtain the third identification number topology of the third image file. This can reduce a calculation amount of generating the third identification number topology and a write delay of updating third image file information.

In addition, the third identification number topology further carries version information and update description information of the third image file, and the update description information is used to reflect different content of the third image file relative to the fourth image file. The update description information is added to the description information. In this way, version management on the image file can be implemented, so that a user learns a difference between the third image file and the fourth image file based on the update description information, to help the user quickly select a required image file. In addition, the difference between the third image file and the fourth image file can be determined without reading and comparing content of data blocks, which can reduce a read delay of the image file system.

Further, the version management is performed on the image file. In this way, in a process of writing a data block into the image file management system, when whether the data block is stored in the image file management system is determined, comparison may be performed on only an image file and an image file of one version in image files generated based on the image file. This reduces a quantity of comparisons and a write delay.

In a possible implementation of the second aspect, after receiving an update instruction used to instruct to update information about a third image file, the image file management method further includes establishing a storage correspondence between each data block included in the third image file and the target edge cloud node, and storing, in an edge cloud node of the image file management system, the storage correspondence between each data block included in the third image file and the target edge cloud node. The storage correspondence is updated, so that the edge cloud node in the image file management system can obtain storage statuses of the data blocks included in the third image file.

According to a third aspect, this application provides an image file management apparatus. The image file management apparatus includes a first receiving module configured to receive a write instruction used to instruct to write a first image file, a first determining module configured to determine, based on the write instruction, at least one first edge cloud node from a plurality of edge cloud nodes included in an image file management system, and a first writing module configured to write a plurality of data blocks included in the first image file into the at least one first edge cloud node, so that each first edge cloud node stores a part or all of the plurality of data blocks included in the first image file.

In a possible implementation of the third aspect, the image file management apparatus further includes a first-generation module configured to generate an identification number of each data block included in the first image file. The first-generation module is further configured to generate a first identification number topology of the first image file based on the identification number of each data block included in the first image file, where the first identification number topology records the data blocks included in the first image file. The first writing module is further configured to store the first identification number topology in an edge cloud node of the image file management system.

In a possible implementation of the third aspect, the first identification number topology further carries version information of the first image file.

In a possible implementation of the third aspect, the image file management apparatus further includes a first establishment module configured to establish, based on a storage status of each data block included in the first image file in the at least one first edge cloud node, a storage correspondence between each data block included in the first image file and a first edge cloud node that stores the corresponding data block in the first image file. The first writing module is further configured to store the storage correspondence in an edge cloud node of the image file management system.

In a possible implementation of the third aspect, the first determining module is further configured to determine a plurality of data blocks that are included in the first image file and that are not stored in any edge cloud node from all the data blocks included in the first image file.

According to a fourth aspect, this application provides an image file management apparatus. The image file management apparatus includes a second receiving module configured to receive a read instruction used to instruct to read a second image file, a second determining module configured to determine, based on the read instruction, one or more second edge cloud nodes that store a data block of the second image file from a plurality of edge cloud nodes included in an image file management system, and a reading module configured to read the data block that belongs to the second image file from the one or more second edge cloud nodes, to obtain the second image file.

In a possible implementation of the fourth aspect, the second determining module is further configured to determine, based on the read instruction, all data blocks included in the second image file, determine one or more data blocks that are not stored in the target edge cloud node from all the data blocks included in the second image file, and determine the second edge cloud node that stores any one of the one or more data blocks.

In a possible implementation of the fourth aspect, the second determining module is further configured to determine a second identification number topology of the second image file based on the read instruction, where the second identification number topology records the data blocks included in the second image file, and determine, based on the second identification number topology, all the data blocks included in the second image file.

In a possible implementation of the fourth aspect, the second determining module is further configured to search a storage correspondence between each data block in the second image file and an edge cloud node that stores the corresponding data block in the second image file, and when a correspondence between a given data block in the second image file and the target edge cloud node is not recorded in a storage correspondence of the given data block in the second image file, determine that the given data block is a data block that is not stored in the target edge cloud node.

In a possible implementation of the fourth aspect, the reading module is further configured to, when a given data block included in the second image file is stored in a plurality of second edge cloud nodes, obtain a download status parameter of each second edge node that stores the given data block, select, based on the download status parameter of each second edge node that stores the given data block, a second edge cloud node from which the given data block is to be downloaded, and download the given data block from the selected second edge cloud node.

In a possible implementation of the fourth aspect, the reading module is further configured to, in the process of downloading the given data block from the selected second edge cloud node, continue to obtain a download status parameter of the selected second edge cloud node, when the download status parameter of the selected second edge cloud node is less than a reference parameter threshold, reselect, from the plurality of second edge nodes that each store the given data block, a second edge cloud node from which the given data block is to be downloaded, where a download status parameter of the reselected second edge cloud node is greater than the reference parameter threshold, and re-downloading the given data block from the re-selected second edge cloud node.

In a possible implementation of the fourth aspect, the image file management apparatus further includes a storage module configured to store the data block that is of the second image file and that is read from the second edge cloud node, and a second writing module configured to store, in an edge cloud node of the image file management system, a storage correspondence between each data block included in the second image file and the target edge cloud node.

In a possible implementation of the fourth aspect, the second receiving module is further configured to receive an update instruction used to instruct to update information about a third image file, where the third image file is generated by the target edge cloud node based on a fourth image file stored in the image file management system.

Correspondingly, the image file management apparatus further includes a second generation module configured to generate an identification number of each data block included in the third image file, where the second generation module is further configured to generate a third identification number topology of the third image file based on the identification number of each data block included in the third image file, and the third identification number topology records data blocks included in the third image file, and a second writing module configured to store the third identification number topology in an edge cloud node of the image file management system.

In a possible implementation of the fourth aspect, when the image file management system further stores a fourth identification number topology of the fourth image file, the second generation module is further configured to determine a first tree sub-topology in the fourth identification number topology, where identifier numbers of same data blocks included in the third image file and the fourth image file are leaf nodes in the first tree sub-topology, generate a second tree sub-topology based on data blocks that are in the data blocks included in the third image file and that are different from data blocks included in the fourth image file, where identification numbers of the data blocks that are in the data blocks included in the third image file and that are different from the data blocks included in the fourth image file are leaf nodes in the second tree sub-topology, and generate the third identification number topology based on the first tree sub-topology and the second tree sub-topology.

In a possible implementation of the fourth aspect, the third identification number topology further carries version information and update description information of the third image file, and the update description information is used to reflect different content of the third image file relative to the fourth image file.

In a possible implementation of the fourth aspect, the image file management apparatus further includes a second establishment module configured to establish a storage correspondence between each data block included in the third image file and the target edge cloud node, and a second writing module configured to store, in an edge cloud node of the image file management system, the storage correspondence between each data block included in the third image file and the target edge cloud node.

According to a fifth aspect, this application provides an image file management system. The image file management system includes a terminal and a plurality of edge cloud nodes, and the edge cloud node is configured to store an image file. The terminal is configured to perform the image file management method according to the first aspect, and the edge cloud node is configured to perform any image file management method according to the second aspect. Alternatively, the terminal is configured to send, to the edge cloud node, a write instruction used to instruct to write a first image file, and the edge cloud node is configured to perform the image file management method according to the first aspect or the second aspect.

According to a sixth aspect, this application provides a computer device. The computer device includes a processor and a memory. A computer program is stored in the memory. When the processor executes the computer program, the computer device implements the image file management method according to the first aspect, or implements the image file management method according to the second aspect.

According to a seventh aspect, this application provides a storage medium. When instructions in the storage medium are executed by a processor, the image file management method according to the first aspect is implemented, or the image file management method according to the second aspect is implemented.

DESCRIPTION OF EMBODIMENTS

To make the objectives, technical solutions, and advantages of this application clearer, the following further describes the implementations of this application in detail with reference to the accompanying drawings.

Edge computing is a technology that deploys a computing task between a cloud and a terminal. The edge computing can directly filter and analyze data sent by the terminal, and can better support real-time processing and execution of a local service, thereby having advantages of energy saving, time saving, and high efficiency. In addition, edge cloud nodes for implementing edge computing are deployed in a distributed manner. With features of the distributed deployment, when the terminal requests a service, an edge cloud node logically closest to the terminal can be used to provide the service for the terminal, to ensure efficiency of serving the terminal.

A cloud service system usually includes a central cloud and an edge cloud. The central cloud is a cloud computing platform built based on a conventional cloud infrastructure and is at the center of a network. Functions of the central cloud are implemented by using a central cloud node. The edge cloud is a cloud computing platform built based on an edge infrastructure. Functions of the edge cloud are implemented by using an edge cloud node. As an extension of the central cloud, the edge cloud can process and store some data under the control of the central cloud, and can extend some services or capabilities (including but not limited to storage, computing, network, artificial intelligence, big data, security, and the like) of the central cloud to the edge cloud, so that the central cloud and the edge cloud can work together to implement functions such as center-edge collaboration, network-wide computing scheduling, and network-wide unified management and control.

Figure 1:
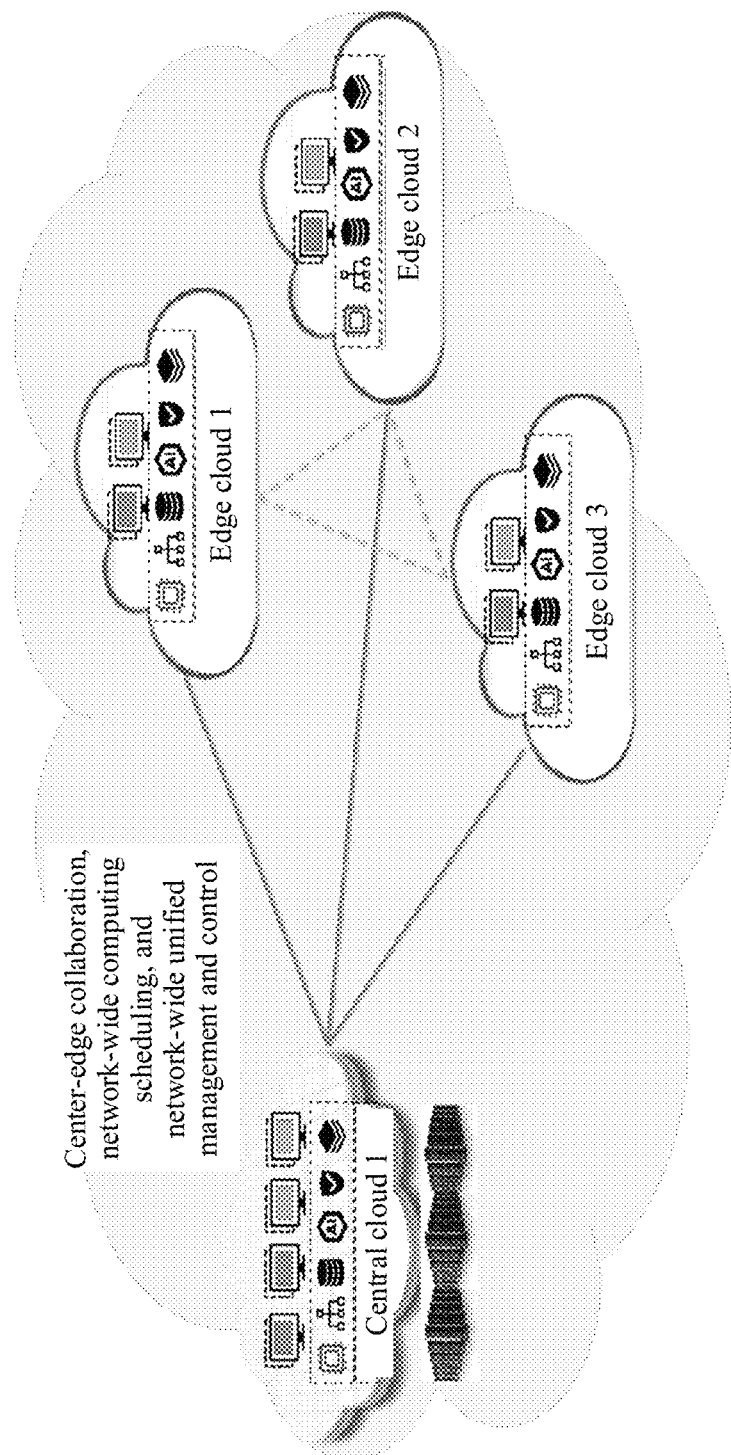
FIG. 1 is a schematic diagram of deployment of a central cloud and edge clouds according to an embodiment of this application.

FIG. 1 is a schematic diagram of deployment of a central cloud and edge clouds according to an embodiment of this application. A central cloud 1 is configured to provide a central cloud service. An edge cloud 1, an edge cloud 2, and an edge cloud 3 are configured to provide edge cloud services. The edge cloud 1 can communicate with the central cloud 1, the edge cloud 2 can communicate with the central cloud 1, the edge cloud 3 can communicate with the central cloud 1, and any two of the edge cloud 1, the edge cloud 2, and the edge cloud 3 can also communicate with each other. Work of the edge cloud 1, the edge cloud 2, and the edge cloud 3 depends on the service provided by the central cloud 1. In this way, as an extension of the central cloud, the edge cloud implements functions such as center-edge collaboration, network-wide computing scheduling, and network-wide unified management and control.

Figure 2:
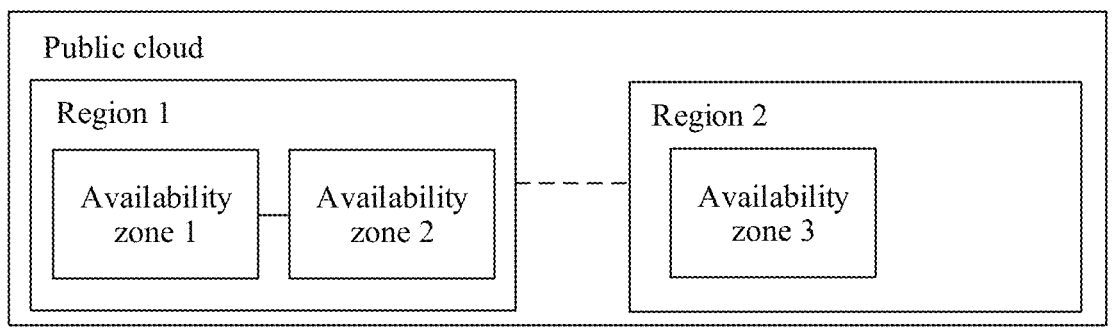
FIG. 2 is a schematic diagram of a public cloud deployment manner in a related technology according to an embodiment of this application.

In a related technology, a public cloud manages an image file by using a powerful data processing capability of a central cloud node. As shown in FIG. 2, an implementation of managing the image file is as follows. Based on deployment regions of cloud service nodes in the public cloud, the public cloud is divided into different regions, an image management service and a storage backend (such as a hard disk) are independently deployed in each region, and each central cloud node is responsible for managing image files in one region. Each region includes a plurality of availability zones. A plurality of availability zones in a same region share a mirror application programming interface (API), a mirror background database, and the storage backend. In addition, a central cloud node in the availability zone is connected to the storage backend by using a low-latency high-speed network, for example, an infiniband (IB) network or a gigabit Ethernet, to ensure transmission bandwidth for the image file. FIG. 2 is a schematic diagram in which the public cloud is divided into a region 1 and a region 2, the region 1 is divided into an availability zone 1 and an availability zone 2, and the region 2 is divided into an availability zone 3.

In addition, in this solution for managing the image file, due to a limitation of a factor, for example, a capacity scale of an edge cloud node, no storage backend is configured on the edge cloud node, and the edge cloud node can store a small quantity of image files only in a cache manner. Therefore, when an edge cloud node needs to use an image file, if a cache of the edge cloud node does not cache the image file required by the edge cloud node, the edge cloud node needs to first download the image file from a central cloud node on which the edge cloud node depends, and then uses the downloaded image file.

However, there are usually many edge cloud nodes that have a dependency relationship with one central cloud node, and available bandwidth of the central cloud node is limited. Therefore, when a plurality of edge cloud nodes all download image files from the central cloud node, the plurality of edge cloud nodes shares the available bandwidth of the central cloud node. Consequently, actual available bandwidth for each edge cloud node to download the image file from the central cloud node is relatively small, time overheads for downloading the image file are relatively high, and a download speed is relatively low. In addition, the edge cloud nodes are usually distributed widely, physical distances from different edge cloud nodes to the central cloud node may be different, and network conditions between different edge cloud nodes and the central cloud node differ greatly. Consequently, speeds at which different edge cloud nodes download image files from the central cloud node differ greatly. Time overheads for downloading image files by some edge cloud nodes are further increased.

An embodiment of this application provides an image file management system. The image file management system includes a terminal and a plurality of edge cloud nodes. The terminal is configured to write an image file to an edge cloud node. Each of the plurality of edge cloud nodes is configured to store a data block in an image file, and the plurality of edge cloud nodes are all configured to be capable of reading data blocks stored in the edge cloud nodes in the image file management system. In this way, when any one of the plurality of edge cloud nodes needs to use the image file, a corresponding data block may be obtained from an edge cloud node that stores the data block in the image file, so that the image file is obtained. In this way, the image file does not need to be downloaded from a central cloud node, a probability that a plurality of edge cloud nodes share available bandwidth of a same cloud node is reduced, available bandwidth of the any edge cloud node and bandwidth between the any edge cloud node and an edge cloud node that stores a data block required by the any edge cloud node can be greatly utilized, time overheads of obtaining the image file are reduced, and a download speed of the image file is improved.

It can be learned from the foregoing that the image file management system provided in this embodiment of this application is essentially a distributed image file management system that performs distributed management on the image file. In the distributed image file management system, each edge cloud node is responsible for storing a part of data of the image file, and is responsible for routing information within a specific range. In addition, storage information of data in the image file is shared among a plurality of edge cloud nodes by using a network, so that when the image file is read from the image file management system, global addressing can be performed in the image file management system based on the shared storage information, and a corresponding data block is read from a storage location indicated by the storage information. In this way, reading of the image file is implemented.

To enable an edge cloud node to have a function of storing an image file, each edge cloud node may be configured with an application programming interface and a storage backend. An application programming interface is configured to provide an external access interface and is configured to respond to a request related to an image file. For example, an application programming interface of an edge cloud node is used for another edge cloud node or a terminal to access the edge cloud node. The application programming interface may support a plurality of types of storage backends, and the storage backend is configured to store a data block in the image file.

In addition, in this embodiment of this application, the image file may be stored in a plurality of forms on the edge cloud node. For example, the image file may be stored by using a storage area network (SAN), network attached storage (NAS), or a local file system. This is not limited in this embodiment of this application. The NAS is a storage form in which a storage device is connected to a group of computers by using a network topology structure (for example, an Ethernet) to implement storage. The SAN is a storage form in which a storage device is connected to a group of computers through a fiber channel to implement storage.

Figure 3:
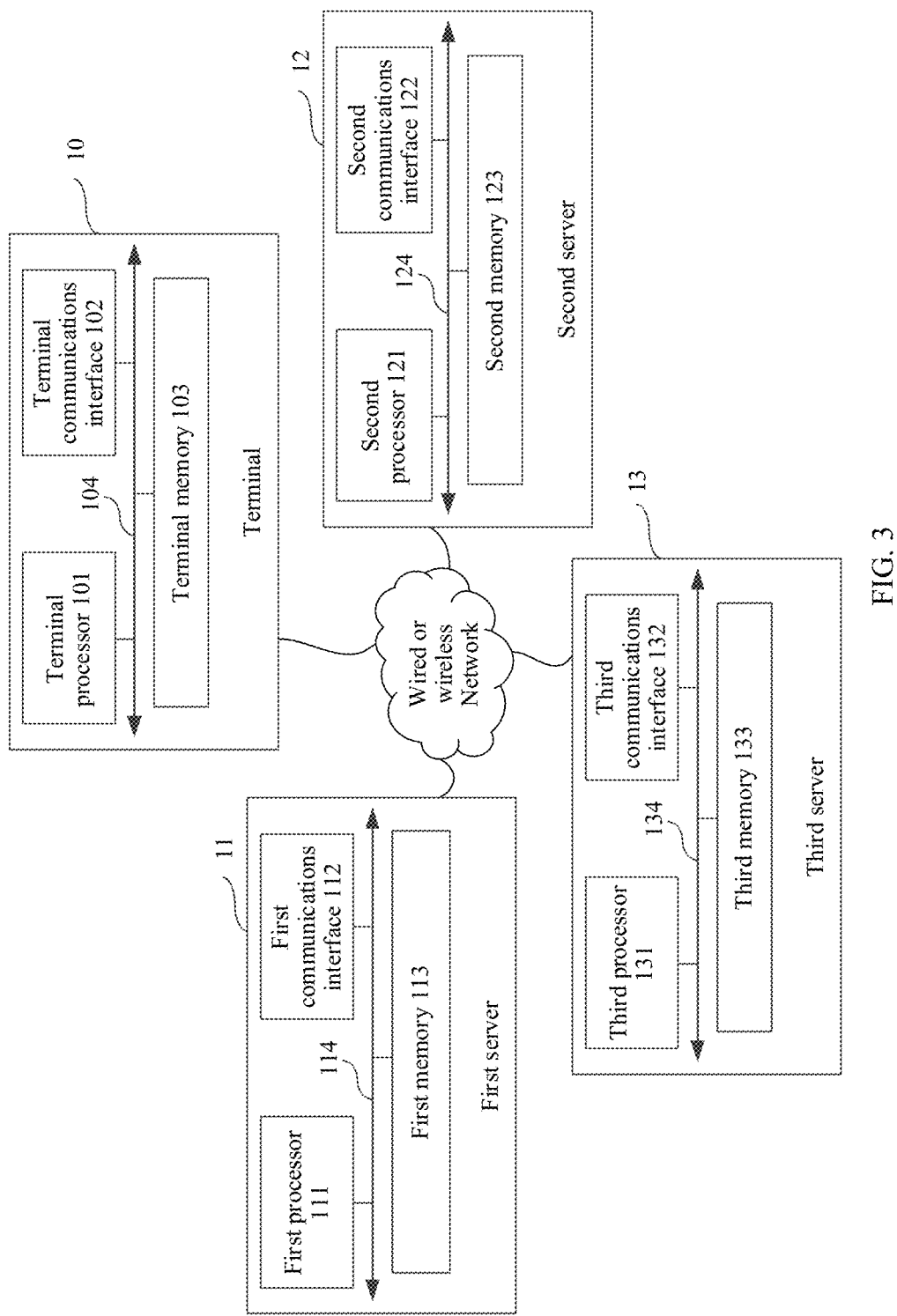
FIG. 3 is a schematic diagram of a structure of an image file management system according to an embodiment of this application.

When the edge cloud node is implemented by a server, the image file management system provided in this embodiment of this application may include a terminal and a plurality of servers. FIG. 3 is a schematic diagram of a structure of an image file management system when the image file management system includes three edge cloud nodes, and the edge cloud node is implemented by a server. As shown in FIG. 3, the image file management system includes a terminal 10, a first server 11, a second server 12, and a third server 13.

A client may be installed in the terminal 10, and a user may interact with the edge cloud node by using the client, or a user may interact with the edge node by using a web page in the terminal 10. The terminal may be a computer, and the computer may be a machine that has a computing function, for example, a general-purpose computer, a special-purpose computer, a personal computer, or a portable mobile terminal. Each server may be one server, or a server cluster including several servers, or a cloud computing service center. Each server and the terminal may be connected through a wired network or a wireless network. Every two servers can be connected through a wired network or a wireless network. For example, every two servers can be connected through a wide area network.

As shown in FIG. 3, the terminal 10 includes a terminal processor 101, a terminal communications interface 102, and a terminal memory 103. The terminal processor 101, the terminal communications interface 102, and the terminal memory 103 are connected to each other by using a terminal bus 104. The first server 11 includes a first processor 111, a first communications interface 112, and a first memory 113. The first processor 111, the first communications interface 112, and the first memory 113 are connected to each other by using a first bus 114. The second server 12 includes a second processor 121, a second communications interface 122, and a second memory 123. The second processor 121, the second communications interface 122, and the second memory 123 are connected to each other by using a second bus 124. The third server 13 includes a third processor 131, a third communications interface 132, and a third memory 133. The third processor 131, the third communications interface 132, and the third memory 133 are connected to each other by using a third bus 134.

The terminal memory 103, the first memory 113, the second memory 123, and the third memory 133 are all configured to store a computer program. In addition, the computer program may be an application. When invoking an application in a corresponding memory, a processor can implement a function of the application. For example, when invoking an application in the first memory 113, the first processor 111 can implement the function of the edge cloud node in the image file management method according to this embodiment of this application.

In FIG. 3, any one of the terminal bus 104, the first bus 114, the second bus 124, and the third bus 134 may be classified into an address bus, a data bus, a control bus, or the like. For ease of representation, only one thick line is used to represent the bus in FIG. 3, but this does not mean that there is only one bus or only one type of bus.

In FIG. 3, any one of the terminal processor 101, the first processor 111, the second processor 121, and the third processor 131 may be a hardware chip. The hardware chip may be an application-specific integrated circuit (ASIC), a programmable logic device (PLD), or a combination thereof. The PLD may be a complex PLD (CPLD), a field-programmable gate array (FPGA), generic array logic (GAL), or any combination thereof. Alternatively, the processor may be a general-purpose processor, for example, a central processing unit (CPU), a network processor (NP), or a combination of the CPU and the NP.

In FIG. 3, any one of the terminal memory 103, the first memory 113, the second memory 123, and the third memory 133 may include a volatile memory, for example, a random-access memory (RAM), or may include a non-volatile memory, for example, a flash memory, a hard disk drive (HDD), or a solid-state drive (SSD), or may include a combination of the foregoing types of memories.

Figure 4:
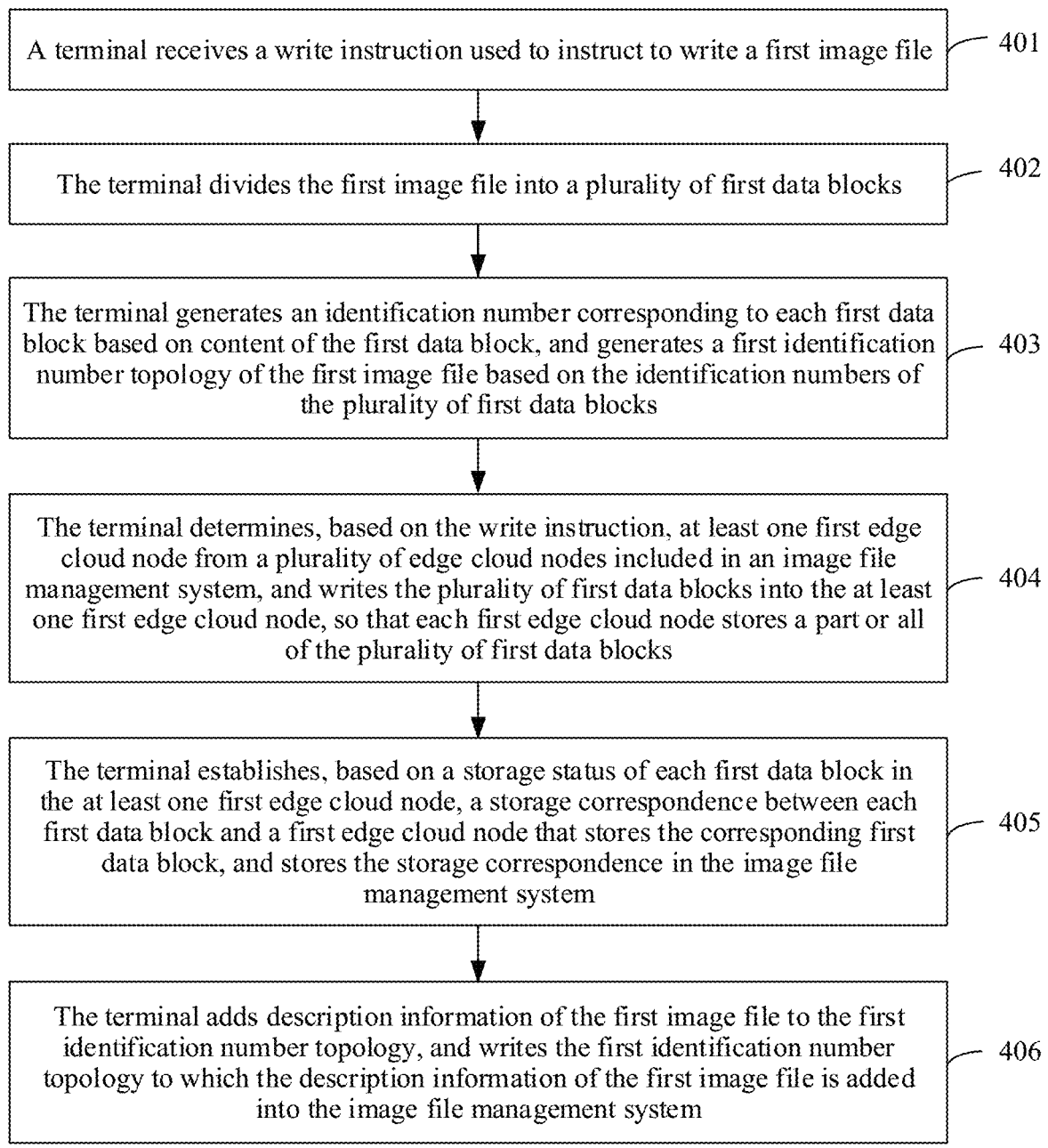
FIG. 4 is a flowchart of an image file management method according to an embodiment of this application.

An embodiment of this application provides an image file management method. The image file management method is used to manage an image file by using an image file management system. The image file management method mainly relates to initial storage, update, and read processes of the image file. The following first describes the initial storage process of the image file. As shown in FIG. 4, initial storage of the image file includes the following steps.

Step 401: A terminal receives a write instruction used to instruct to write a first image file.

When a user needs to upload the image file to the image file management system, the user may perform a specified operation on the terminal to trigger the write instruction, to instruct, by using the write instruction, to write the first image file into the image file management system.

An image file is made from a plurality of files by using burning software or an image file making tool, and the image file may be considered as a copy of the plurality of files. When the plurality of files needs to be copied, the image file of the plurality of files may be copied. This can reduce time of copying, migration, and import processes. For example, the image file may be understood as a copy of data on a disk. When the user needs to copy a plurality of files from the disk to another disk, the user can directly copy an image file of the plurality of files.

Step 402: The terminal divides the first image file into a plurality of first data blocks.

In an implementation, the terminal may divide the first image file into a plurality of data blocks based on a specified size (for ease of description and differentiation, data blocks in the first image file are collectively referred to as first data blocks in this specification). For example, it is assumed that a size of the first image file is 1 GB, the terminal may divide the first image file into 1024 first data blocks based on a size of 1 megabyte (MB) of each first data block.

Step 403: The terminal generates an identification number corresponding to each first data block based on content of the first data block, and generates a first identification number topology of the first image file based on identification numbers of the plurality of first data blocks.

For any first data block, the terminal may generate an identification number of the first data block based on content of the first data block and according to a preset identification number generation algorithm. The identification number of the first data block is used to uniquely identify the first data block in the image file management system. For example, the identification number of the first data block may be a hash value, and the preset identification number generation algorithm may be an encryption algorithm, for example, an MD5 message digest algorithm or a secure hash algorithm (SHA).

After the identification number of each first data block is generated, the identification numbers of the plurality of first data blocks may be converted according to a preset conversion algorithm, to obtain an identification number of the first image file and the first identification number topology of the first image file. The identification number topology of the image file records a relationship between an identification number of a data block in the image file and the identification number of the image file, that is, the identification number topology of the image file records data blocks included in the image file.

Figure 5:
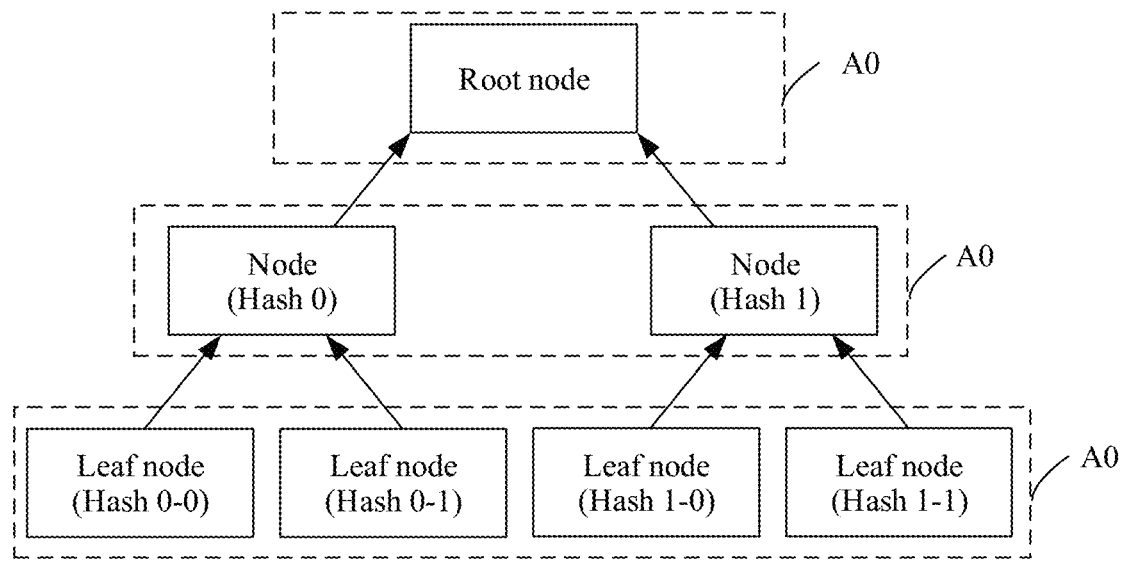
FIG. 5 is a schematic diagram of a first identification number topology according to an embodiment of this application.

For example, as shown in FIG. 5, when the identification number of the first data block is a hash value, the first identification number topology may be a hash tree using hash values of the plurality of first data blocks as leaf nodes. In this case, the identification number of the first image file is a hash value located on a root node of the hash tree. The hash tree shown in FIG. 5 includes three layers (one layer is in each dashed-line box A0). In a top-down direction, a node located at the bottom of the hash tree is a leaf node of the hash tree, and a node located at the top of the hash tree is the root node of the hash tree. In nodes located at two adjacent layers and connected to each other, a node located at an upper layer is a parent node of a node located at a lower layer.

A hash tree generation process is as follows. The plurality of first data blocks are classified into N1 groups, where each group of first data blocks includes a first specified quantity of first data blocks. Then, on a group-basis, an encryption algorithm is performed on hash values of the plurality of first data blocks in each group, to generate a hash value of the hash values of the plurality of first data blocks in each group, where a hash value generated based on hash values of a plurality of first data blocks in any group is a parent node of a hash value of each first data block in the any group, and a hash value of any first data block in the any group may be referred to as a child node of the parent node. After the hash value of the parent node is obtained, a directed arrow pointing to the parent node from the hash value of each first data block in the any group is added. Then, N1 parent nodes are grouped into N2 groups, and each group includes a second specified quantity of parent nodes. Then, on a group-basis, a hash value is regenerated based on hash values of the plurality of parent nodes in each group, and a hash value regenerated based on hash values of a plurality of parent nodes in any group is used as a parent node of each parent node in the any group. Then, a directed arrow pointing to the parent node generated based on the hash values of the plurality of parent nodes in the any group from a hash value of each parent node in the any group is added, and this process is repeated until the root node of the hash tree is obtained. In addition, the encryption algorithm for generating the parent node in the hash tree may be the same as or different from the encryption algorithm used when the identification number of the first data block is generated. This is not limited in this embodiment of this application.

It should be noted that a quantity of child nodes of a parent node may be adjusted according to an actual requirement. For example, in FIG. 5, each parent node has two child nodes. Correspondingly, in the hash tree shown in FIG. 5, the root node forms one layer of the hash tree, a parent node whose hash value is hash 0 and a parent node whose hash value is hash 1 form another layer of the hash tree, and a leaf node whose hash value is hash 0-0, a leaf node whose hash value is hash 0-1, a leaf node whose hash value is hash 1-0, and a leaf node whose hash value is hash 1-1 form still another layer of the hash tree. Hash 0 is a hash value obtained by performing an encryption algorithm on hash 0-0 and hash 0-1, hash 1 is a hash value obtained by performing the encryption algorithm on hash 1-0 and hash 1-1, and the hash value of the root node is a hash value obtained by performing the encryption algorithm on hash 0 and hash 1.

Step 404: The terminal determines, based on the write instruction, at least one first edge cloud node from a plurality of edge cloud nodes included in the image file management system, and writes the plurality of first data blocks into the at least one first edge cloud node, so that each first edge cloud node stores a part or all of the plurality of first data blocks.

In an implementation of step 404, the terminal may determine one first edge cloud node from the plurality of edge cloud nodes included in the image file management system, and write all the plurality of first data blocks into the first edge cloud node. After the terminal writes all the plurality of first data blocks into the first edge cloud node, the first edge cloud node may store the plurality of first data blocks, to complete a writing process of the plurality of first data blocks.

Optionally, the first edge cloud node may be an edge cloud node that is logically closest to the terminal in the plurality of edge cloud nodes included in the image file management system. Because quality of a link for communication between the edge cloud node that is logically closest to the terminal and the terminal is relatively good, the plurality of first data blocks are stored on the first edge cloud node, so that a write delay of writing the first image file by the terminal can be reduced.

In addition, when a plurality of first data blocks are stored on one edge cloud node, if the edge cloud node needs to use the first image file, a quantity of first data blocks that is included in the first image file and that is obtained by the edge cloud node from another edge cloud node can be reduced, and time overheads of obtaining the first image file by the edge cloud node are reduced.

In another implementation of step 404, the terminal may determine a plurality of first edge cloud nodes from the plurality of edge cloud nodes included in the image file management system, and separately write some or all of the plurality of first data blocks into the plurality of first edge cloud nodes correspondingly. After the terminal separately writes some or all of the plurality of first data blocks into the plurality of first edge cloud nodes correspondingly, each first edge cloud node may store a first data block that is written into the first edge cloud node, to complete a writing process of the plurality of first data blocks.

The plurality of first edge cloud nodes may be determined by the terminal according to a specified policy. For example, the terminal may determine the plurality of first edge cloud nodes based on the plurality of first data blocks according to a specified mapping method, and the plurality of first edge cloud nodes separately correspond to the plurality of first data blocks. In this case, when the plurality of first data blocks are written into the plurality of first edge cloud nodes, the plurality of first data blocks may be separately written into the corresponding first edge cloud nodes, so that the plurality of first edge cloud nodes separately store some or all of the plurality of first data blocks. In this way, each of the plurality of first edge cloud nodes stores at least a part of the first data blocks included in the first image file. This can reduce a probability that the first edge cloud node obtains, from another edge cloud node, a first data block included in the first image file, and can reduce a probability that a delay problem occurs on the first edge cloud node.

For example, in the image file management system, a plurality of edge cloud nodes are separately responsible for a segment of storage address. Therefore, when determining the plurality of first edge cloud nodes, the terminal may map each first data block to a segment of storage address according to a consistent hash algorithm and based on content of each first data block, and determine an edge cloud node responsible for the segment of storage address as a first edge cloud node configured to store the corresponding first data block.

It should be noted that, in the other implementation of step 404, first data blocks stored in different first edge cloud nodes may include a same first data block. Alternatively, first data blocks stored in different first edge cloud nodes may be completely different first data blocks. In this way, the image file management system does not need to store duplicate data blocks, and storage utilization of the edge cloud node can be ensured.

In addition, in step 404, the plurality of first data blocks written by the terminal into the first edge cloud node may be a plurality of first data blocks that are not stored in any edge cloud node and that are in all first data blocks obtained by dividing the first image file. In this case, before an operation of writing a first data block into a first edge cloud node is performed, a plurality of first data blocks that are not stored in any edge cloud node may be first determined from all the first data blocks obtained through division. Then, the plurality of first data blocks that are not stored in any edge cloud node are written into at least one first edge cloud node, to avoid writing duplicate data into the image file management system. This reduces bandwidth occupation, reduces a write delay, and improves storage utilization of the image file management system.

When a data block is written into the image file management system, for ease of searching for the data block in the image file management system, an identification number of the data block may also be written into the image file management system. Therefore, in a process of determining whether any first data block is already stored in the image file management system, whether an identification number of the any first data block is already stored in the image file management system may be queried, and when the identification number of the any first data block is not stored in the image file management system, it is determined that the image file management system does not store the any first data block.

It should be noted that, in step 404, the plurality of first data blocks that are not stored in any edge cloud node may be first determined, and then one or more first edge cloud nodes are determined based on the plurality of first data blocks that are not stored in any edge cloud node. Then, the plurality of first data blocks that are not stored in any edge cloud node are separately written into the corresponding first edge cloud node. Alternatively, one or more first edge cloud nodes may be determined based on all the first data blocks obtained through division, and then a plurality of first data blocks that are not stored in any edge cloud node are determined. Then, the plurality of first data blocks that are not stored in any edge cloud node are written into the one or more first edge cloud nodes. This is not limited in this embodiment of this application.

Step 405: The terminal establishes, based on a storage status of each first data block in the at least one first edge cloud node, a storage correspondence between each first data block and a first edge cloud node that stores the corresponding first data block, and stores the storage correspondence in the image file management system.

After a first edge cloud node stores a first data block written by the terminal into the first edge cloud node, the first edge cloud node may send, to the terminal, a response indicating storage completion. The terminal may determine, based on the response, that the first edge cloud node stores the corresponding first data block, and establish a storage correspondence. Then, the terminal writes the storage correspondence into the image file management system, to store the storage correspondence in the image file management system.

The storage correspondence is used to reflect storage statuses of a plurality of first data blocks in one or more first edge cloud nodes, that is, used to indicate which first edge cloud nodes store any first data block. In an implementation, a storage correspondence between any first data block and a first edge cloud node that stores the any first data block may be a correspondence between a hash value of the any first data block and a physical address of the first edge cloud node that stores the any first data block.

Storing the storage correspondence in the image file management system may be implemented by storing the storage correspondence in an edge cloud node in the image file management system. In this case, an implementation of step 405 may include the following. The terminal determines one edge cloud node from the plurality of edge cloud nodes, and writes the storage correspondence into the edge cloud node, so that all the other edge cloud nodes in the image file management system can obtain the storage correspondence by accessing the edge cloud node.

The storage correspondence is stored in the image file management system, so that the plurality of edge cloud nodes in the image file management system can obtain storage statuses of the plurality of first data blocks in the one or more first edge cloud nodes according to the storage correspondence.

Step 406: The terminal adds description information of the first image file to the first identification number topology, and writes the first identification number topology to which the description information of the first image file is added into the image file management system.

The description information (or commit information) of the first image file is used to describe the first image file, to help a user learn content of the first image file. The description information of the first image file includes metadata information such as a name, version information, and permission control information of the first image file. The version information records information such as a size and upload time of the first image file, and may further record information about first data blocks included in the first image file. The permission control information records information about a user who has permission to access or modify the first image file.

After the description information of the first image file is added to the first identification number topology, the first identification number topology to which the description information of the first image file is added may be written into the image file management system, so that a plurality of edge cloud nodes obtain, based on the first identification number topology to which the description information is added, first data blocks included in the first image file, and learn content of the first image file based on the description information.

In addition, writing the first identification number topology to which the description information of the first image file is added into the image file management system may be implemented by writing the first identification number topology to an edge cloud node in the image file management system. The edge cloud node that stores the first identification number topology to which the description information of the first image file is added may be the same as or different from the edge cloud node that stores the storage correspondence of the first image file. This is not limited in this embodiment of this application.

Figure 6:
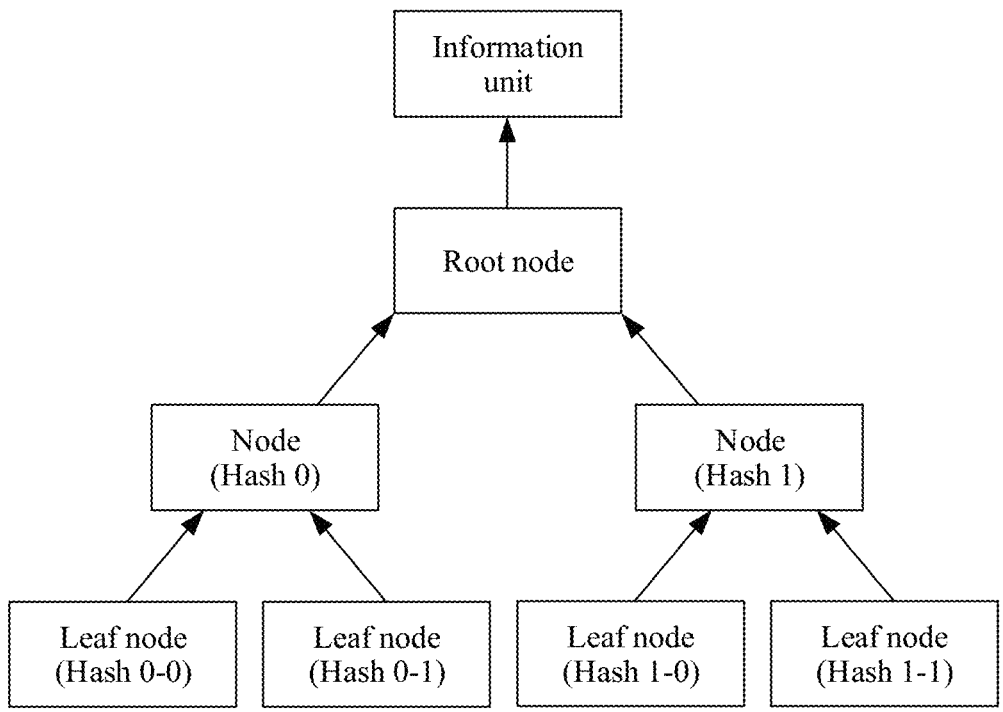
FIG. 6 is a schematic diagram of a structure of a first directed acyclic graph obtained based on a hash tree shown in FIG. 5 according to an embodiment of this application.

In an implementation, when the first identification number topology is a hash tree, an implementation in which the description information of the first image file is added to the first identification number topology may include the following. A hash value of a hash tree root node of the first image file and commit information of the first image file are filled in an information unit, the information unit after the information is filled is connected in series to the hash tree root node of the first image file, and the information unit is used as a parent node of the hash tree root node, to obtain a first directed acyclic graph (DAG) of the first image file. The information unit after the information is filled is an information set that uses the hash value of the hash tree root node of the first image file, the commit information of the first image file, and the like as elements. FIG. 6 is a schematic diagram of a structure of a first directed acyclic graph obtained based on the hash tree shown in FIG. 5.

It should be noted that in the foregoing descriptions of step 401 to step 406, an example in which an execution body is a client is used for description. However, the execution body may not be limited to the terminal. For example, an execution body of step 401 to step 406 may alternatively be an edge cloud node. In this case, in step 401, the write instruction received by the edge cloud node may be sent by the terminal, and the write instruction may be triggered after the terminal performs an upload operation of the first image file. In step 404, when the plurality of first data blocks are written into one first edge cloud node, the first edge cloud node may be the edge cloud node that is used as the execution body of step 404, or when the plurality of first data blocks are written into a plurality of first edge cloud nodes, for a manner of determining the plurality of first edge cloud nodes, correspondingly, refer to the implementation of determining the plurality of first edge cloud nodes in step 404. Correspondingly, when execution bodies of step 402, step 403, step 405, and step 406 may be an edge cloud node, for implementations of corresponding steps, refer to implementations of corresponding steps.

In addition, a step sequence of the image file management method may be properly adjusted, or the steps may be correspondingly added or deleted according to a situation. For example, according to an application requirement, step 406 may be performed after step 403 is performed, and then step 404 and step 405 are performed. Any variation method readily figured out by a person skilled in the art within the technical scope disclosed in this application shall fall within the protection scope of this application, and details are not described herein.

In conclusion, according to the image file management method provided in this embodiment of this application, data blocks included in the first image file are stored by edge cloud nodes, so that when any edge cloud node in the image file management system needs to use an image file, a corresponding data block may be obtained from an edge cloud node that stores data blocks in the image file, to obtain the image file required by the any edge cloud node, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file In addition, the image file is divided into data blocks, so that the edge cloud node performs storage by using a data block as a unit. Compared with a related technology in which an image file is written by using the image file as a unit, this refines a write granularity of the image file, so that a data block stored in the image file management system does not need to be written into the image file management system again. This avoids repeated writing of the data block, reduces occupied bandwidth for writing data, reduces a write delay, and improves storage utilization of the image file management system.

In addition, the first identification number topology of the first image file is generated, so that the user can quickly determine, based on the first identification number topology in a process of reading the first image file, the first data blocks included in the first image file. Further, description information of the first image file is added to the first identification number topology, so that content of the first image file can be quickly determined, and the data blocks included in the first image file and the content of the first image file do not need to be determined in a manner of reading the data blocks. This can reduce a read delay.

Figure 7:
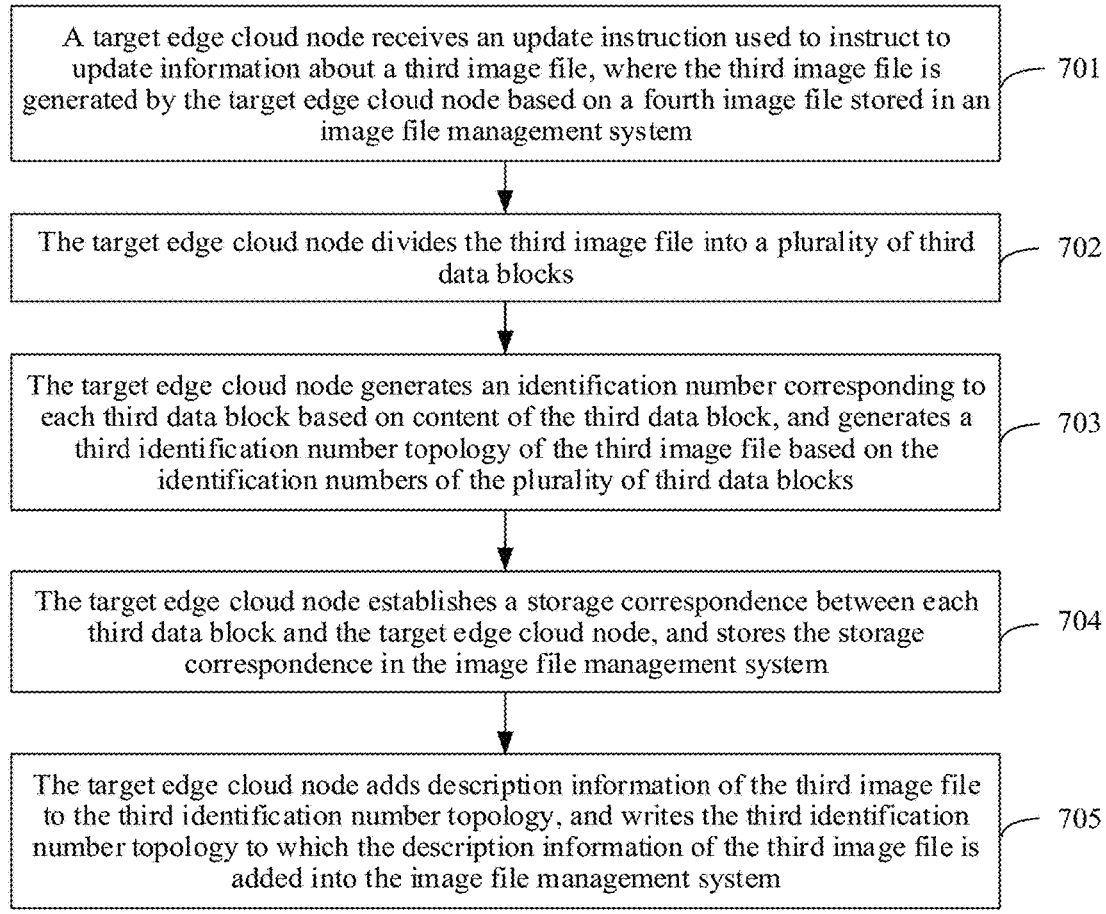
FIG. 7 is a flowchart of a method for updating information about an existing image file in an image file management system according to an embodiment of this application.

The following describes a process of updating information about an existing image file in an image file management system. As shown in FIG. 7, the update process includes the following steps.

Step 701: A target edge cloud node receives an update instruction used to instruct to update information about a third image file, where the third image file is generated by the target edge cloud node based on a fourth image file stored in the image file management system.

The third image file may be an image file obtained after the target edge cloud node performs a preset operation on the fourth image file. For example, in the cloud computing field, the target edge cloud node may create an instance such as a virtual machine or a container in any edge cloud node in the image file management system by using the fourth image file. After the instance such as the virtual machine or the container is created, an image file may further be re-created based on the created instance such as the virtual machine or the container, where the re-created image file is an image file generated based on the fourth image file. For example, when the fourth image file is an image file of a virtual machine, the virtual machine may be created in the target edge cloud node based on the fourth image file, and after the virtual machine is created, a new application may be installed in the created virtual machine. In this case, the created virtual machine has data (namely, new data) different from the fourth image file. When an image file is created based on the created virtual machine, the created image file includes the new data. In addition, because the created image file is created in the target edge node, the created image file is already stored in the image file management system. In this case, information about the created image file may be updated in the image file management system. In this way, another edge cloud node can obtain the created image file based on the information, which ensures data integrity of the image file stored in the image file management system. Furthermore, information about image files of different versions is stored in the image file management system, so that a user can conveniently select, based on a requirement, an image file to be used. For example, the user may select an image file from the fourth image file and the third image file based on an application requirement, and create a virtual machine based on the selected image file. The fourth image file and the first image file may be the same image file, or may be different image files. This is not limited in this embodiment of this application.

Step 702: The target edge cloud node divides the third image file into a plurality of third data blocks.

For an implementation process of step 702, refer to the implementation process of step 402. In addition, a division manner of the third image file may be the same as a division manner of the fourth image file. In addition, because the third image file is generated based on the fourth image file, a composition manner of the third image file is relatively similar to a composition manner of the fourth image file. Therefore, when the division manner of the fourth image file is the same as the division manner of the third image file, there is a higher probability that a data block that is the same as a fourth data block included in the fourth image file exists in the plurality of third data blocks obtained through division. For ease of description and ease of differentiation, in this specification, data blocks in the third image file are collectively referred to as the third data blocks, and data blocks in the fourth image file are collectively referred to as the fourth data blocks.

Step 703: The target edge cloud node generates an identification number corresponding to each third data block based on content of the third data block, and generates a third identification number topology of the third image file based on the identification numbers of the plurality of third data blocks.

For an implementation process of generating the identification number of the third data block, refer to the implementation process of generating the identification number of the first data block. In addition, for an implementation of generating the third identification number topology, correspondingly, refer to the implementation of generating the first identification number topology.

Figure 8:
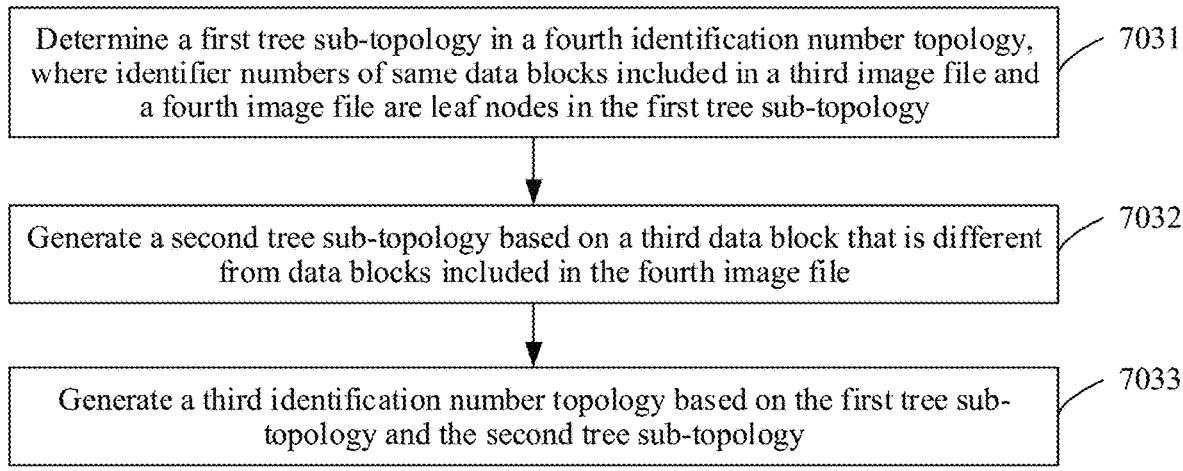
FIG. 8 is a flowchart of a method for incrementally updating a fourth identification number topology to obtain a third identification number topology according to an embodiment of this application.

Alternatively, in another implementation of generating the third identification number topology, incremental update may be performed on the fourth identification number topology based on the fourth identification number topology and based on a third data block that is different from data blocks included in the fourth image file, to obtain the third identification number topology, so as to reduce a calculation amount of generating the third identification number topology. As shown in FIG. 8, an implementation may include the following steps.

Step 7031: Determine a first tree sub-topology in a fourth identification number topology, where identifier numbers of same data blocks included in the third image file and the fourth image file are leaf nodes in the first tree sub-topology.

Because an identification number of a data block is used to uniquely identify the data block, when identification numbers of two data blocks are the same, it indicates that content of the two data blocks is the same. Therefore, data blocks whose identification numbers are the same in the third image file and the fourth image file may be determined as same data blocks in the fourth image file and the third image file (referred to as same data blocks below for ease of description), and a third data block whose identification number is different from identification numbers of all fourth data blocks in the fourth image file is determined as the third data block that is different from the data blocks included in the fourth image file.

When determining the first tree sub-topology in the fourth identification number topology, identification numbers of all same data blocks in the third image file and the fourth image file may be first determined, and topology parts that use the identification numbers of all the same data blocks as leaf nodes are determined as the first tree sub-topology. In addition, the identification number located at the top of the first tree sub-topology may be considered as a root node of the first tree sub-topology.

Figure 9:
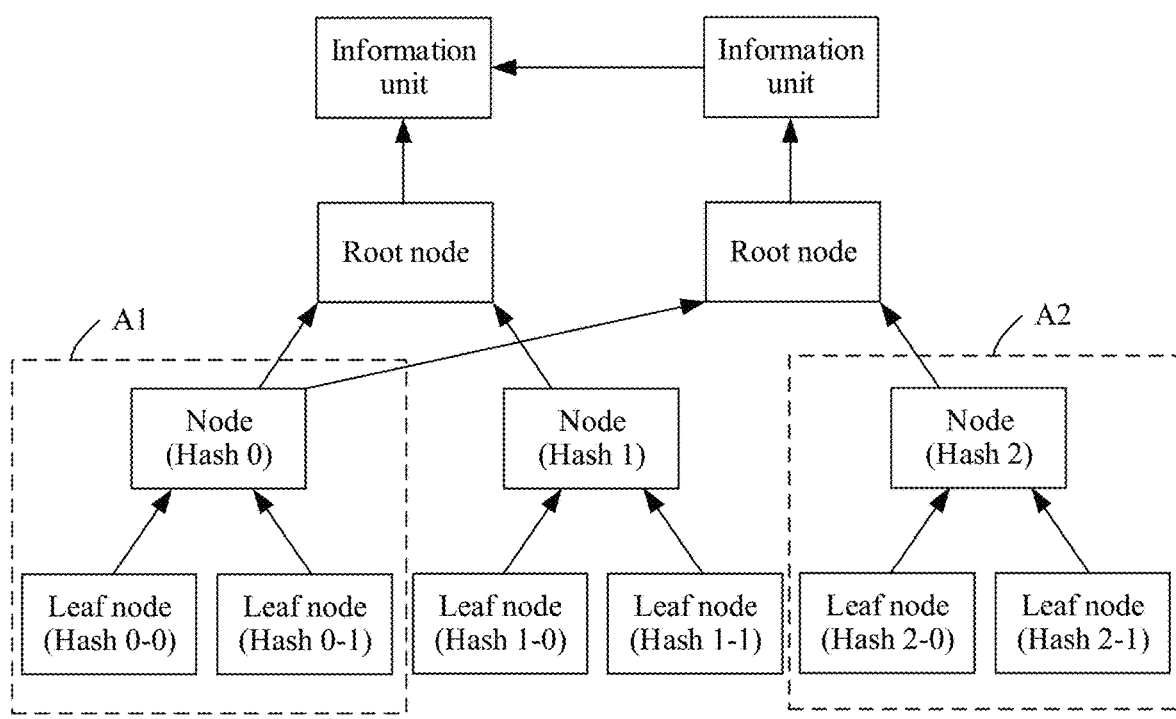
FIG. 9 is a schematic diagram of a principle of incrementally updating a first identification number topology to obtain a third identification number topology according to an embodiment of this application.

For example, it is assumed that the fourth image file includes fourth data blocks L11 to L14, a hash value of the fourth data block L11 is 01a3b001a10c01 (indicated by hash 0-0 in FIG. 9), a hash value of the fourth data block L12 is 01a3b001a10c02 (indicated by hash 0-1 in FIG. 9), a hash value of the fourth data block L13 is 01a3b001a10c03 (indicated by hash 1-0 in FIG. 9), and a hash value of the fourth data block L14 is 01a3b001a10c04 (indicated by hash 1-1 in FIG. 9). The third image file includes third data blocks L21 to L24, a hash value of the third data block L21 is 01a3b001a10c01 (indicated by hash 0-0 in FIG. 9), a hash value of the third data block L22 is 01a3b001a10c02 (indicated by hash 0-1 in FIG. 9), a hash value of the third data block L23 is 01a3b001a10c0d (indicated by hash 2-0 in FIG. 9), and a hash value of the third data block L24 is 01a3b001a10caf (indicated by hash 2-1 in FIG. 9). In this way, it may be determined that the fourth data block L11 and the third data block L21 are same data blocks. The fourth data block L12 and the third data block L22 are same data blocks, and the third data block L23 and the third data block L24 are different from all the data blocks in the fourth image file. In this case, in step 7031, topology parts that use the hash value of the fourth data block L11 and the hash value of the fourth data block L12 as leaf nodes may be determined as the first tree sub-topology. As shown in a first hash sub-tree in a dashed-line box A1 in FIG. 9, the first hash sub-tree uses the hash value hash 0-0 of the fourth data block L11 and the hash value hash 0-1 of the fourth data block L12 as leaf nodes. In other words, the first hash sub-tree includes the hash value hash 0-0 of the fourth data block L11, the hash value hash 0-1 of the fourth data block L12, and a hash value hash 0 of a parent node that uses the hash value of the fourth data block L11 and the hash value of the fourth data block L12 as child nodes. In addition, because the parent node is located on the top of the first hash sub-tree, it may be considered that the parent node is a root node of the first hash sub-tree.

Step 7032: Generate a second tree sub-topology based on the third data block that is different from the data blocks included in the fourth image file.

The process of generating the second tree sub-topology based on the third data block that is different from the data blocks included in the fourth image file is essentially a process of generating, based on an identification number of the third data block that is different from the data blocks included in the fourth image file, an identification number topology of an image file including the third data block that is different from the data blocks included in the fourth image file. Therefore, for an implementation process of step 7032, refer to the implementation process of step 403. The example in step 7031 is also used as an example, where a second hash sub-tree generated based on the hash value of the third data block L23 and the hash value of the third data block L24 is shown in a dashed-line box A2 in FIG. 9. In addition, a hash value (namely, hash 2) located at the top end of the second hash sub-tree may be considered as a root node of the second hash sub-tree.

Step 7033: Generate the third identification number topology based on the first tree sub-topology and the second tree sub-topology.

After the first tree sub-topology and the second tree sub-topology are obtained, an encryption algorithm may be performed again on the root node of the first tree sub-topology and the root node of the second tree sub-topology. Based on identification numbers of the root node of the first tree sub-topology and the root node of the second tree sub-topology, the identification number is the root node of the third identification number topology, and then, directed arrows that respectively point from the root node of the first tree sub-topology and the root node of the second tree sub-topology to the root node of the third identification number topology are added, to obtain the third identification number topology.

For example, as shown in FIG. 9, a second hash tree generated based on the first hash sub-tree shown in the dashed-line box A1 in FIG. 9 and the second hash sub-tree shown in the dashed-line box A2 in FIG. 9 is shown in FIG. 9.

Step 704: The target edge cloud node establishes a storage correspondence between each third data block and the target edge cloud node, and stores the storage correspondence in the image file management system.

Because the third image file is created in the target edge cloud node, all third data blocks of the third image file are stored in the target edge cloud node, that is, the image file management system already stores the third image file. In this case, a storage correspondence of a third data block in the third image file needs to be stored in the image file management system, so that another edge cloud node can obtain storage information of the third data block. In addition, an implementation of storing the storage correspondence in the image file management system may include the following two cases.

In a first case, if a third data block is stored in the target edge cloud node, and another edge cloud node in the image file management system does not store the third data block, a storage correspondence between the third data block and the target edge cloud node may be added to the image file management system. For an implementation process of adding the storage correspondence between the third data block and the target edge cloud node to the image file management system, correspondingly, refer to the implementation process in which the terminal stores the storage correspondences between the plurality of first data blocks and the first edge cloud node in the image file management system in step 405. For example, a record used to indicate a correspondence between a hash value of the third data block and a physical address of the target edge cloud node may be added to the image file management system.

In a second case, if a third data block is not only stored in the target edge cloud node, but also stored in another edge cloud node in the image file management system, a correspondence between the third data block and the target edge cloud node may be added to the storage correspondence of the third data block.

Step 705: The target edge cloud node adds description information of the third image file to the third identification number topology, and writes the third identification number topology to which the description information of the third image file is added into the image file management system.

For an implementation process of step 705, refer to the implementation process of step 406. A second directed acyclic graph of the third image file obtained after the description information of the third image file is added to the third identification number topology is shown in FIG. 9.

In addition, because the third image file is generated based on the fourth image file, the description information of the third image file may further include update description information, and the update description information is used to indicate difference information of the third image file relative to the fourth image file. The update description information is added to the description information. In this way, version management on the image file can be implemented, so that the user learns a difference between the third image file and the fourth image file based on the update description information, to help the user quickly select a required image file. In addition, the difference between the third image file and the fourth image file can be determined without reading and comparing content of data blocks, which can reduce a read delay of the image file system. In addition, the version management is performed on the image file. In this way, in a process of writing a data block into the image file management system, when whether the data block is stored in the image file management system is determined, comparison may be performed on only an image file and an image file of one version in image files generated based on the image file. This reduces a quantity of comparisons and a write delay.

It should be noted that a step sequence of the image file management method may be properly adjusted, or the steps may be correspondingly added or deleted according to a situation. For example, a sequence of performing step 704 and step 705 may be adjusted according to an application requirement. Any variation method readily figured out by a person skilled in the art within the technical scope disclosed in this application shall fall within the protection scope of this application, and details are not described herein.

In conclusion, according to the image file management method provided in this embodiment of this application, information about an image file stored in the image file management system is updated, so that another edge cloud node in the image file management system can obtain the stored image file based on the information, which ensures data integrity of the image file stored in the image file management system.

In addition, when the third image file is an image file generated based on the fourth image file, incremental update is performed on the fourth identification number topology of the fourth image file to obtain the third identification number topology of the third image file. This can reduce a calculation amount of generating the third identification number topology and a write delay of updating third image file information.

The update description information is added to the description information. In this way, version management on the image file can be implemented, so that the user learns a difference between the third image file and the fourth image file based on the update description information, to help the user quickly select a required image file. In addition, the difference between the third image file and the fourth image file can be determined without reading and comparing content of data blocks, which can reduce a read delay of the image file system. Further, the version management is performed on the image file. In this way, in a process of writing a data block into the image file management system, when whether the data block is stored in the image file management system is determined, comparison may be performed on only an image file and an image file of one version in image files generated based on the image file. This reduces a quantity of comparisons and a write delay.

Figure 10:
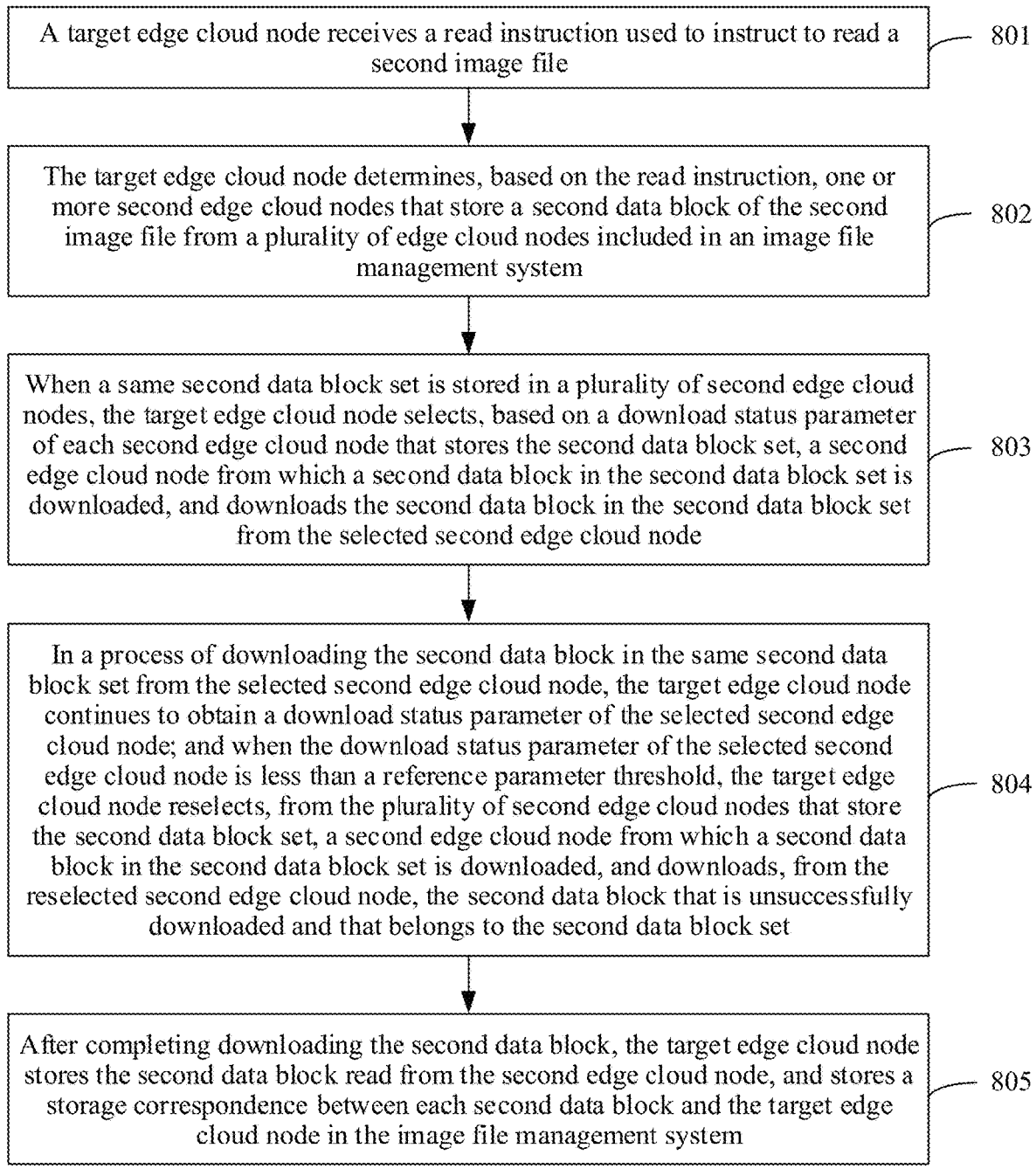
FIG. 10 is a flowchart of an image file reading method according to an embodiment of this application.

The following describes a process of reading an image file. As shown in FIG. 10, the process of reading the image file includes the following steps.

Step 801: A target edge cloud node receives a read instruction used to instruct to read a second image file.

A terminal may send, to the target edge cloud node, a read instruction that carries an identification number of the second image file, to instruct the target edge node to read an image file in an image file management system, and perform a specified operation based on the image file. For example, the terminal may instruct the target edge node to read an image file from the image file management system, and create an instance such as a virtual machine or a container by using the image file. In addition, before creating the instance, the terminal may first search for whether the image file management system stores the second image file required for creating the instance. When determining that the image file management system stores the second image file, the terminal may send, to the target edge cloud node, the read instruction that carries the identification number of the second image file, to request the target edge cloud node to read the second image file from the image file management system, and create the instance in the target edge cloud node by using the second image file. An application programming interface is configured in the image file management system. The terminal may search, through the application programming interface, the image file management system for information about image files stored in the image file management system, and determine whether the second image file is stored in the image file management system.

Step 802: The target edge cloud node determines, based on the read instruction, one or more second edge cloud nodes that store a second data block of the second image file from a plurality of edge cloud nodes included in the image file management system.

In an implementation, the target edge cloud node may store a part of the second data blocks of the second image file (for ease of description and ease of differentiation, data blocks in the second image file are collectively referred to as second data blocks in this specification). Therefore, in a process of reading the second image file, the second data block that belongs to the second image file and that is not stored in the target edge cloud node may be read from the second edge cloud node, to obtain the second image file. Correspondingly, an implementation process of step 802 may include determining, based on the read instruction, all second data blocks included in the second image file, then, determining, from all the second data blocks, one or more second data blocks that are not stored in the target edge cloud node, and determining, as the second edge cloud node, an edge cloud node that stores any second data block that is not stored in the target edge cloud node.

Because an identification number topology of an image file records a relationship between an identification number of a data block included in the image file and an identification number of the image file, the target edge cloud node may determine a second identification number topology of a second image file based on an identification number of the second image file carried in the read instruction, and determine, based on the second identification number topology, all second data blocks included in the second image file.

In addition, because the image file management system stores a storage correspondence between a second data block and an edge cloud node for storing the second data block, an edge cloud node that stores each second data block may be determined based on the storage correspondence. When an edge cloud node that stores a given second data block does not include the target edge cloud node, it is determined that the given second data block is a second data block that belongs to the second image file and that is not stored in the target edge cloud node. Correspondingly, the edge cloud node storing the second data block that belongs to the second image file and that is not stored in the target edge cloud node is the second edge cloud node.

Compared with an implementation in which a second data block that belongs to the second image file and that is not stored in the target edge cloud node is determined by comparing content of all data blocks stored in the target edge cloud node with content of each second data block, an implementation of determining data blocks included in an image file based on an identification number topology and determining, based on a storage correspondence between a data block and an edge cloud node, a second data block that belongs to the second image file and that is not stored in the target edge cloud node can reduce a data processing amount in the process of determining the second data block that belongs to the second image file and that is not stored in the target edge cloud node, to further reduce a read delay of the second image file.

Step 803: When a same second data block set is stored in a plurality of second edge cloud nodes, the target edge cloud node selects, based on a download status parameter of each second edge cloud node that stores the second data block set, a second edge cloud node from which a second data block in the second data block set is downloaded, and downloads the second data block in the second data block set from the selected second edge cloud node.

The second data block set includes one or more second data blocks. For example, when a second edge cloud node A1 stores a second data block B1, and a second edge cloud node A2 also stores the second data block B1, it may be considered that both the second edge cloud node A1 and the second edge cloud node A2 store a same second data block set, and the second data block set includes the second data block B1. When the second edge cloud node A1 stores a second data block B1 and a second data block B2, and the second edge cloud node A2 also stores the second data block B1 and the second data block B2, it may be considered that both the second edge cloud node A1 and the second edge cloud node A2 store a same second data block set, and the second data block set includes the second data block B1 and the second data block B2.

When a same second data block set is stored in a plurality of second edge cloud nodes, the target edge cloud node may obtain a download status parameter of each second edge cloud node that stores the second data block set, filter, based on the download status parameter of each second edge cloud node that stores the second data block set, the plurality of second edge cloud nodes that store the second data block set, select, from the plurality of second edge cloud nodes that store the second data block set, a second edge cloud node with optimal download performance that is indicated by the download status parameter as a second edge cloud node used as a download source, and then download a second data block in the second data block set from the second edge cloud node with optimal download performance, to ensure a download speed.

The download status parameter is used to reflect a download speed at which the target edge cloud node downloads a second data block from a corresponding second edge cloud node. Optionally, a download status parameter of the second edge cloud node includes parameters such as network traffic between the second edge cloud node and the target edge cloud node and a network delay, a load status parameter of the second edge cloud node, and the like. In an implementation, the target edge cloud node may communicate with the second edge cloud node, and obtain the download status parameter of the second edge cloud node by using a network detection technology. For example, the target edge cloud node may send a detection data packet to the second edge cloud node, and obtain the parameters such as the network traffic between the target edge cloud node and the second edge cloud node and the network delay based on a response of the second edge cloud node to receiving the detection data packet.

A second edge cloud node with optimal download performance is selected from a plurality of second edge cloud nodes that each store a second data block set, and a second data block in the second data block set is downloaded from the selected second edge cloud node, which can ensure a download speed of the second data block, reduce bandwidth consumption, and reduce a download delay.

Step 804: In a process of downloading the second data block in the same second data block set from the selected second edge cloud node, the target edge cloud node continues to obtain a download status parameter of the selected second edge cloud node. When the download status parameter of the selected second edge cloud node is less than a reference parameter threshold, the target edge cloud node reselects, from the plurality of second edge cloud nodes that store the second data block set, a second edge cloud node from which a second data block in the second data block set is downloaded, and downloads, from the reselected second edge cloud node, the second data block that is unsuccessfully downloaded and that belongs to the second data block set.

A download status parameter of the reselected second edge cloud node is greater than the reference parameter threshold. The second data block that is not successfully downloaded may include a second data block that is incompletely downloaded, a second data block that is not downloaded completely, and a second data block with incorrect download content. Optionally, whether the downloaded second data block is a second data block with incorrect download content may be determined by using hash check, and an implementation may include generating a hash value based on content of the downloaded second data block, comparing the generated hash value with a hash value of the second data block stored in the image file management system, and when the generated hash value is the same as the hash value of the second data block stored in the image file management system, determining that the downloaded content of the downloaded second data block is correct, or when the generated hash value is different from the hash value of the second data block stored in the image file management system, determining that the downloaded second data block is a data block with incorrect download content.

When the download status parameter of the second edge cloud node is less than the reference parameter threshold, it indicates a case in which a download link between the target edge cloud node and the second edge cloud node is interrupted, bandwidth decreases, or the like. In other words, a download speed at which the target edge cloud node downloads a data block from the second edge cloud node cannot meet a download requirement. In this case, a second edge cloud node used as the download source may be reselected, to ensure the download speed. For an implementation process of obtaining the download status parameter of the second edge cloud node in step 804, correspondingly, refer to an implementation process of obtaining the download status parameter of the second edge cloud node in step 803. For an implementation process of reselecting a second edge cloud node from the plurality of second edge cloud nodes that each store the second data block set in step 804, correspondingly, refer to an implementation process of selecting the second edge cloud node in step 803. Details are not described herein again.

In addition, in a process of continuing to download the second data block in the same second data block set from the reselected second edge cloud node, the following may be repeatedly performed: obtaining a download status parameter of the reselected second edge cloud node, when the download status parameter is less than the reference parameter threshold, continuing to reselect a second edge cloud node used as the download source, and continuing to download the second data block from the reselected second edge cloud node until downloading the second data block in the same second data block set is completed.

Step 805: After completing downloading the second data block, the target edge cloud node stores the second data block read from the second edge cloud node, and stores a storage correspondence between each second data block and the target edge cloud node in the image file management system.

After the target edge cloud node completes downloading the second data block, the target edge cloud node may store the downloaded second data block, and add information about the target edge cloud node to the storage correspondence of each second data block, to indicate that the target edge cloud node also stores the second data block, so that another edge cloud node in the image file management system can obtain storage information of the second data block. In addition, an implementation process of step 805 may include adding, to the storage correspondence of each second data block, a correspondence between each second data block and the target edge cloud node.

It should be noted that, when the second image file is an image file that is used by a terminal to indicate the target edge cloud node to create an instance, after the target edge cloud node obtains the second image file, the target edge cloud node may further create an instance in the target edge cloud node based on the second image file.

In addition, a step sequence of the image file management method may be properly adjusted, or the steps may be correspondingly added or deleted according to a situation. For example, whether to perform step 804 may be selected according to an application requirement. Any variation method readily figured out by a person skilled in the art within the technical scope disclosed in this application shall fall within the protection scope of this application, and details are not described herein.

In conclusion, according to the image file management method provided in this embodiment of this application, because the image file management system includes the plurality of edge cloud nodes, each edge cloud node is configured with a function of storing an image file, and the plurality of edge cloud nodes are configured to be capable of reading file block data stored by the edge cloud node in the image file management system, so that when any edge cloud node in the image file management system needs to use an image file, a corresponding data block may be obtained from an edge cloud node that stores data blocks in the image file, to obtain the image file, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file.

In addition, the image file is divided into blocks, so that the edge cloud node can perform a read operation by using a data block as a unit. Compared with a related technology in which the image file is read by using an image file as a unit, a read granularity of the image file is refined. In this way, data blocks of a required image file can be separately read from different edge cloud nodes. On one hand, available bandwidth can be allocated based on an amount of data that needs to be read, and therefore, the available bandwidth can be greatly utilized, and a read delay can be reduced. On the other hand, the second data block that belongs to the second image file and that is not stored in the target edge cloud node is read, and therefore, the amount of data that needs to be read can be reduced, and the read delay can be further reduced.

Furthermore, when the second data block is downloaded, the download status parameter of the second edge cloud node that stores the second data block is obtained, and the second edge cloud node used as a download source is determined based on the download status parameter, to avoid that a download speed when an image file is downloaded from a fixed cloud node is limited by a network condition between the edge cloud node and the fixed cloud node. This can reduce time overheads for downloading the image file, ensure a download speed of the second data block, and reduce a read delay of reading the image file.

Figure 11:
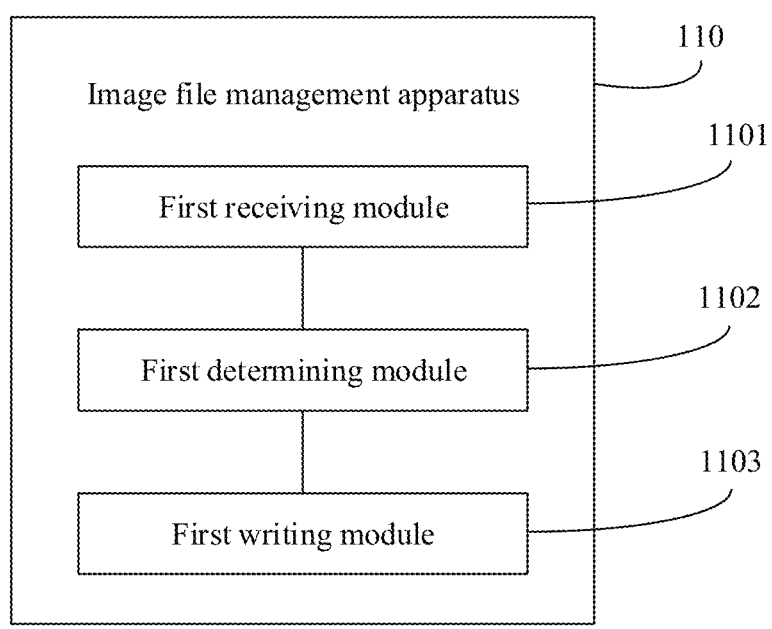
FIG. 11 is a schematic diagram of a structure of an image file management apparatus according to an embodiment of this application.

An embodiment of this application further provides an image file management apparatus. The image file management apparatus may be deployed in a terminal or an edge cloud node. As shown in FIG. 11, the image file management apparatus 110 may include a first receiving module 1101 configured to receive a write instruction used to instruct to write a first image file, a first determining module 1102 configured to determine, based on the write instruction, at least one first edge cloud node from a plurality of edge cloud nodes that may be included in an image file management system, and a first writing module 1103 configured to write a plurality of data blocks included in the first image file into the at least one first edge cloud node, so that each first edge cloud node stores a part or all of the plurality of data blocks included in the first image file.

Figure 12:
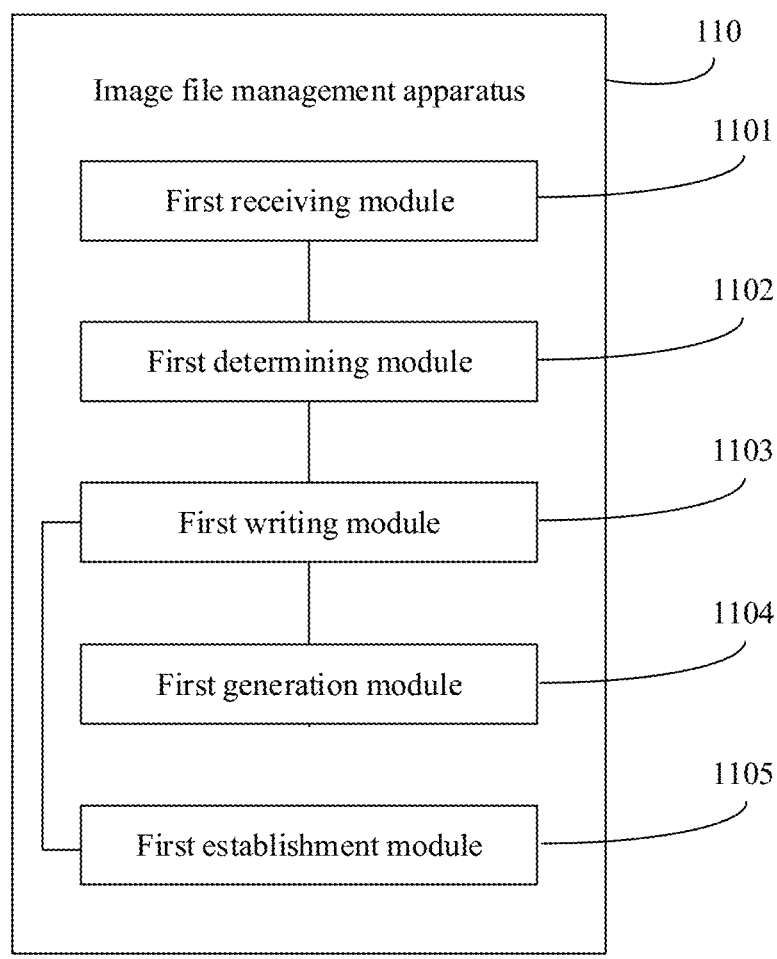
FIG. 12 is a schematic diagram of a structure of another image file management apparatus according to an embodiment of this application.

Optionally, as shown in FIG. 12, the image file management apparatus 110 may further include a first-generation module 1104 configured to generate an identification number of each data block included in the first image file.

The first-generation module 1104 is further configured to generate a first identification number topology of the first image file based on the identification number of each data block included in the first image file, where the first identification number topology records the data blocks that may be included in the first image file.

The first writing module 1103 is further configured to store the first identification number topology in an edge cloud node of the image file management system.

Optionally, the first identification number topology further carries version information of the first image file.

Optionally, as shown in FIG. 12, the image file management apparatus 110 may further include a first establishment module 1105 configured to establish, based on a storage status of each data block included in the first image file in the at least one first edge cloud node, a storage correspondence between each data block included in the first image file and a first edge cloud node that stores the corresponding data block in the first image file.

The first writing module 1103 is further configured to store the storage correspondence in an edge cloud node of the image file management system.

Optionally, the first determining module 1102 is further configured to determine a plurality of data blocks that are included in the first image file and that are not stored in any edge cloud node from all the data blocks included in the first image file.

In conclusion, according to the image file management apparatus provided in this embodiment of this application, data blocks included in the first image file are stored by edge cloud nodes, so that when any edge cloud node in the image file management system needs to use an image file, a corresponding data block may be obtained from an edge cloud node that stores data blocks in the image file, to obtain the image file required by the any edge cloud node, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file.

In addition, the image file is divided into data blocks, so that the edge cloud node performs storage by using a data block as a unit. Compared with a related technology in which an image file is written by using the image file as a unit, this refines a write granularity of the image file, so that a data block stored in the image file management system does not need to be written into the image file management system again. This avoids repeated writing of the data block, reduces occupied bandwidth for writing data, reduces a write delay, and improves storage utilization of the image file management system.

In addition, the first identification number topology of the first image file is generated, so that the user can quickly determine, based on the first identification number topology in a process of reading the first image file, the first data blocks included in the first image file. Further, description information of the first image file is added to the first identification number topology, so that content of the first image file can be quickly determined, and the data blocks included in the first image file and the content of the first image file do not need to be determined in a manner of reading the data blocks. This can reduce a read delay.

Figure 13:
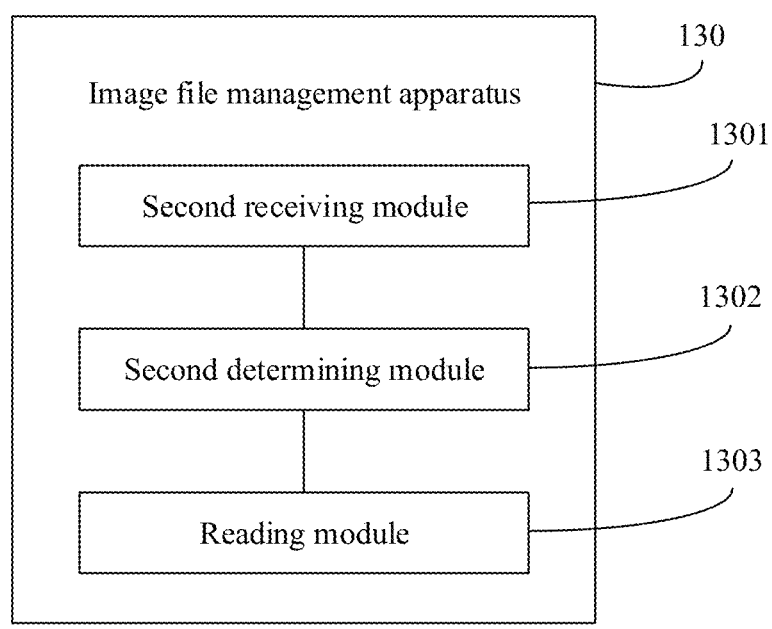
FIG. 13 is a schematic diagram of a structure of still another image file management apparatus according to an embodiment of this application.

An embodiment of this application further provides an image file management apparatus. The image file management apparatus may be deployed on an edge cloud node. As shown in FIG. 13, the image file management apparatus 130 may include a second receiving module 1301 configured to receive a read instruction used to instruct to read a second image file, a second determining module 1302 configured to determine, based on the read instruction, one or more second edge cloud nodes that store a data block of the second image file from a plurality of edge cloud nodes included in an image file management system, and a reading module 1303 configured to read the data block that belongs to the second image file from the one or more second edge cloud nodes, to obtain the second image file.

Optionally, the second determining module 1302 is further configured to determine, based on the read instruction, all data blocks included in the second image file, determine one or more data blocks that are not stored in a target edge cloud node from all the data blocks included in the second image file, and determine the second edge cloud node that stores any one of the one or more data blocks.

Optionally, an implementation process in which the second determining module 1302 determines, based on the read instruction, all the data blocks included in the second image file further includes determining a second identification number topology of the second image file based on the read instruction, where the second identification number topology records the data blocks that may be included in the second image file, and determining, based on the second identification number topology, all the data blocks included in the second image file.

Optionally, an implementation process in which the second determining module 1302 determines one or more data blocks that are not stored in the target edge cloud node from all the data blocks included in the second image file further includes searching a storage correspondence between each data block in the second image file and an edge cloud node that stores the corresponding data block in the second image file, and when a correspondence between a given data block in the second image file and the target edge cloud node is not recorded in a storage correspondence of the given data block in the second image file, determining that the given data block is a data block that is not stored in the target edge cloud node.

Optionally, the reading module 1303 is further configured to, when a given data block included in the second image file is stored in a plurality of second edge cloud nodes, obtain a download status parameter of each second edge node that stores the given data block, select, based on the download status parameter of each second edge node that stores the given data block, a second edge cloud node from which the given data block is to be downloaded, and download the given data block from the selected second edge cloud node.

Optionally, an implementation process in which the reading module 1303 downloads the given data block from the selected second edge cloud node further include, in the process of downloading the given data block from the selected second edge cloud node, continuing to obtain a download status parameter of the selected second edge cloud node, when the download status parameter of the selected second edge cloud node is less than a reference parameter threshold, reselecting, from the plurality of second edge nodes that each store the given data block, a second edge cloud node from which the given data block is to be downloaded, where a download status parameter of the reselected second edge cloud node is greater than the reference parameter threshold, and re-downloading the given data block from the re-selected second edge cloud node.

Figure 14:
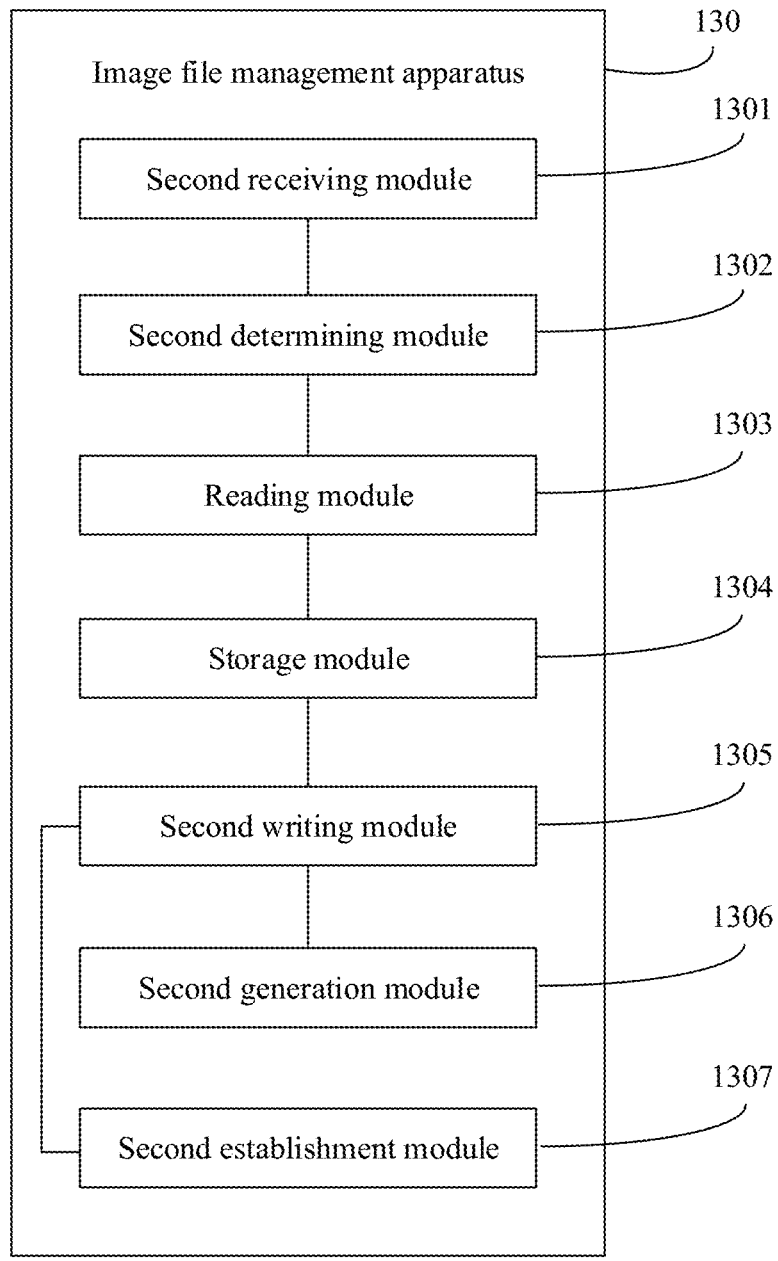
FIG. 14 is a schematic diagram of a structure of a yet another image file management apparatus according to an embodiment of this application.

Optionally, as shown in FIG. 14, the image file management apparatus 130 may further include a storage module 1304 configured to store the data block that is of the second image file and that is read from the second edge cloud node, and a second writing module 1305 configured to store, in an edge cloud node of the image file management system, a storage correspondence between each data block included in the second image file and the target edge cloud node.

According to the image file management apparatus provided in this embodiment of this application, because the image file management system includes the plurality of edge cloud nodes, each edge cloud node is configured with a function of storing an image file, and the plurality of edge cloud nodes are configured to be capable of reading file block data stored by the edge cloud node in the image file management system, so that when any edge cloud node in the image file management system needs to use an image file, a corresponding data block may be obtained from an edge cloud node that stores data blocks in the image file, to obtain the image file, and the image file does not need to be downloaded from a central cloud node. This reduces a probability that the plurality of edge cloud nodes share available bandwidth of a same cloud node, can greatly utilize available bandwidth of the any edge cloud node and bandwidth between the any edge cloud node and the edge cloud node that stores the data block required by the any edge cloud node, reduces time overheads for obtaining the image file, and improves a download speed of the image file.

In addition, the image file is divided into blocks, so that the edge cloud node can perform a read operation by using a data block as a unit. Compared with a related technology in which the image file is read by using an image file as a unit, a read granularity of the image file is refined. In this way, data blocks of a required image file can be separately read from different edge cloud nodes. On one hand, available bandwidth can be allocated based on an amount of data that needs to be read, and therefore, the available bandwidth can be greatly utilized, and a read delay can be reduced. On the other hand, the second data block that belongs to the second image file and that is not stored in the target edge cloud node is read, and therefore, the amount of data that needs to be read can be reduced, and the read delay can be further reduced.

Furthermore, when the second data block is downloaded, the download status parameter of the second edge cloud node that stores the second data block is obtained, and the second edge cloud node used as a download source is determined based on the download status parameter, to avoid that a download speed when an image file is downloaded from a fixed cloud node is limited by a network condition between the edge cloud node and the fixed cloud node. This can reduce time overheads for downloading the image file, ensure a download speed of the second data block, and reduce a read delay of reading the image file.

Optionally, the second receiving module 1301 is further configured to receive an update instruction used to instruct to update information about a third image file, where the third image file is generated by the target edge cloud node based on a fourth image file stored in the image file management system.

Optionally, as shown in FIG. 14, the image file management apparatus 130 may further include a second-generation module 1306 configured to generate an identification number of each data block included in the third image file.

The second-generation module 1306 is further configured to generate a third identification number topology of the third image file based on the identification number of each data block included in the third image file, where the third identification number topology records data blocks included in the third image file.

The second writing module 1305 is configured to store the third identification number topology in an edge cloud node of the image file management system.

Optionally, when the image file management system further stores a fourth identification number topology of the fourth image file, the second generation module 1306 is further configured to determine a first tree sub-topology in the fourth identification number topology, where identifier numbers of same data blocks included in the third image file and the fourth image file are leaf nodes in the first tree sub-topology, generate a second tree sub-topology based on data blocks that are in the data blocks included in the third image file and that are different from data blocks included in the fourth image file, where identification numbers of the data blocks that are in the data blocks included in the third image file and that are different from the data blocks included in the fourth image file are leaf nodes in the second tree sub-topology, and generate the third identification number topology based on the first tree sub-topology and the second tree sub-topology.

Optionally, the third identification number topology further carries version information and update description information of the third image file, and the update description information is used to reflect different content of the third image file relative to the fourth image file.

Optionally, as shown in FIG. 14, the image file management apparatus 130 may further include a second establishment module 1307 configured to establish a storage correspondence between each data block included in the third image file and the target edge cloud node.

The second writing module 1305 is configured to store, in an edge cloud node of the image file management system, the storage correspondence between each data block included in the third image file and the target edge cloud node.

In conclusion, according to the image file management apparatus provided in this embodiment of this application, information about an image file stored in the image file management system is updated, so that another edge cloud node in the image file management system can obtain the stored image file based on the information, which ensures data integrity of the image file stored in the image file management system.

In addition, when the third image file is an image file generated based on the fourth image file, incremental update is performed on the fourth identification number topology of the fourth image file to obtain the third identification number topology of the third image file. This can reduce a calculation amount of generating the third identification number topology and a write delay of updating third image file information.

The update description information is added to the description information. In this way, version management on the image file can be implemented, so that a user learns a difference between the third image file and the fourth image file based on the update description information, to help the user quickly select a required image file. In addition, the difference between the third image file and the fourth image file can be determined without reading and comparing content of data blocks, which can reduce a read delay of the image file system. Further, the version management is performed on the image file. In this way, in a process of writing a data block into the image file management system, when whether the data block is stored in the image file management system is determined, comparison may be performed on only an image file and an image file of one version in image files generated based on the image file. This reduces a quantity of comparisons and a write delay.

It may be clearly understood by a person skilled in the art that, for the purpose of convenient and brief description, for a detailed working process of the foregoing apparatus, and module, refer to a corresponding process in the method embodiments. Details are not described herein again.

An embodiment of this application further provides a computer device. The computer device includes a processor and a memory. The memory stores a computer program. When the processor executes the computer program, the computer device implements the image file management method according to the embodiments of this application. The computer device may be a server or a terminal. When the computer device is the server, for a structure of the computer device, correspondingly refer to a structure of a first server, a second server, or a third server in FIG. 3, or when the computer device is the terminal, for a structure of the computer device, refer to a structure of the terminal in FIG. 3. Details are not described herein again.

An embodiment of this application further provides a storage medium. The storage medium is a non-volatile computer-readable storage medium. When instructions in the storage medium are executed by a processor, the image file management method according to the embodiments of this application is implemented.

An embodiment of this application further provides a computer program product including instructions. When the computer program product is run on a computer, the computer is enabled to perform the image file management method according to the embodiments of this application.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, a compact disc, or the like.

In the embodiments of this application, the terms "first", "second", and "third" are merely used for a purpose of description, and shall not be understood as an indication or implication of relative importance. Unless otherwise explicitly limited, the term "at least one" refers to one or more, and the term "a plurality of" refers to two or more.

The term "and/or" in this application describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, improvement, or the like made without departing from the concept and principle of this application should fall within the protection scope of this application.

What is claimed is:

1. An image file management method implemented by a terminal, wherein the image file management method comprises:
   receiving a write instruction instructing to write an image file into an image file management system, wherein the image file comprises first data blocks, and wherein the image file management system comprises the terminal and a plurality of edge cloud nodes;
   generating identification numbers of the first data blocks based on content of the first data blocks and based on a preset identification number generation algorithm, wherein each of the identification numbers uniquely identify one of the first data blocks;
   converting, according to a preset conversion algorithm, the identification numbers into an image file identification number of the image file;
   generating, based on the identification numbers and the image file identification number, an identification number topology of the image file, wherein the identification number topology records the first data blocks, wherein the identification number topology records a relationship between the identification numbers and the image file identification number, so that the identification number topology records the first data blocks;
   adding description information of the image file to the identification number topology;
   dividing the image file into the first data blocks;
   determining, based on the write instruction, at least one first edge cloud node from the plurality of edge cloud nodes;
   writing the identification number topology to which the description information of the image file has been added to an edge cloud node of the plurality of edge cloud nodes;
   storing the identification number topology in one of the plurality of edge cloud nodes;
   checking whether any of the identification numbers of the first data blocks is stored in the image file management system;
   determining, based on the checking, a first plurality of second data blocks of the first data blocks, wherein the first plurality of second data blocks are comprised in the image file and stored in any edge cloud node in the plurality of edge cloud nodes;
   determining, based on the checking, a second plurality of second data blocks of the first data blocks, wherein the second plurality of second data blocks are comprised in the image file and are not stored in any edge cloud node in the plurality of edge cloud nodes; and
   writing the second plurality of second data blocks into the at least one first edge cloud node so that each of the at least one first edge cloud node stores at least a portion of the first data blocks,
   wherein the identification number topology comprises version information of the image file.

2. The image file management method of claim 1, wherein after writing the second plurality of second data blocks, the image file management method further comprises:
   establishing, based on a storage status of each of the first data blocks, a storage correspondence between each of the first data blocks and the at least one first edge cloud node that stores each of the first data blocks of the image file; and storing the storage correspondence in one of the plurality of edge cloud nodes of the image file management system.

3. The image file management method of claim 1, wherein the description information comprises name, the version information, and permission control information of the image file.

4. A terminal comprising:
a memory configured to store a computer program; and
a processor coupled to the memory and configured to execute the computer program to cause the terminal to:
receive a write instruction instructing to write an image file into an image file management system, wherein the image file comprises first data blocks, and wherein the image file management system comprises the terminal and a plurality of edge cloud nodes;
generate identification numbers of the first data blocks based on content of the first data blocks and based on a preset identification number generation algorithm, wherein each of the identification numbers uniquely identify one of the first data blocks;
convert, according to a preset conversion algorithm, the identification numbers into an image file identification number of the image file;
generate, based on the identification numbers and the image file identification number, an identification number topology of the image file, wherein the identification number topology records the first data blocks, wherein the identification number topology records a relationship between the identification numbers and the image file identification number, so that the identification number topology records the first data blocks;
add description information of the image file to the identification number topology;
divide the image file into the first data blocks;
determine, based on the write instruction, at least one first edge cloud node from the plurality of edge cloud nodes;
write the identification number topology to which the description information of the image file has been added to an edge cloud node of the plurality of edge cloud nodes;
store the identification number topology in one of the plurality of edge cloud nodes;
check whether any of the identification numbers of the first data blocks is stored in the image file management system;
determine, based on the checking, a first plurality of second data blocks of the first data blocks, wherein the first plurality of second data blocks are comprised in the image file and stored in any edge cloud node in the plurality of edge cloud nodes;
determine, based on the checking, a second plurality of second data blocks of the first data blocks, wherein the second plurality of second data blocks are comprised in the image file and are not stored in any edge cloud node in the plurality of edge cloud nodes; and
write the second plurality of second data blocks into the at least one first edge cloud node so that each of the at least one first edge cloud node stores at least a portion of the first data blocks,
wherein the identification number topology comprises version information of the image file.

5. The terminal of claim 4, wherein the processor is further configured to execute the computer program to cause the terminal to:
establish, based on a storage status of each of the first data blocks, a storage correspondence between each of the first data blocks and at least one first cloud node that stores each of the first data blocks of the image file; and
store the storage correspondence in the edge cloud node.

6. The terminal of claim 4, wherein the description information comprises name, the version information, and permission control information of the image file.

* * * * *